United States Patent
Frank et al.

(10) Patent No.: US 6,731,622 B1
(45) Date of Patent: *May 4, 2004

(54) MULTIPATH PROPAGATION DELAY DETERMINING MEANS USING PERIODICALLY INSERTED PILOT SYMBOLS

(75) Inventors: Georg Frank, Nürnberg (DE); Mathias Schulist, Erlangen (DE); Wolfgang Granzow, Heroldsberg (DE); Alexander Maurer, Büchenbach (DE); Branislav Popovic, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/320,638

(22) Filed: May 26, 1999

Related U.S. Application Data

(63) Continuation-in-part of application No. 09/070,778, filed on May 1, 1998, now Pat. No. 6,370,397.

(30) Foreign Application Priority Data

May 29, 1998 (DE) .......................................... 198 24 218

(51) Int. Cl.[7] ........................ H04B 15/00; H04B 7/005; H04B 7/01; H04B 7/015
(52) U.S. Cl. ........................ 370/342; 455/63.1; 455/65; 455/67.13; 455/501; 370/350
(58) Field of Search ................................. 370/335, 342, 370/350; 455/63.1, 67.13, 65, 501, 504, 506

(56) References Cited

U.S. PATENT DOCUMENTS

| | | | |
|---|---|---|---|
| 5,081,651 A | 1/1992 | Kubo | 375/94 |
| 5,263,026 A | 11/1993 | Parr et al. | 370/95.1 |

(List continued on next page.)

FOREIGN PATENT DOCUMENTS

| | | |
|---|---|---|
| DE | 195 06117 C1 | 8/1996 |
| DE | 196 15257 A1 | 10/1996 |
| WO | WO 96 10873 | 4/1996 |
| WO | WO 96/10873 | 4/1996 |
| WO | WO 95 12262 | 5/1996 |
| WO | WO 96/19056 | 6/1996 |
| WO | WO 96/24988 | 8/1996 |
| WO | WO 97/02714 | 1/1997 |

OTHER PUBLICATIONS

Kammeyer, K.D.; "Nachrichtenübertrangung"; *Informationstechnik*, 1992; pp. 76–85.

Färjh, et al.; "A Testbed for Wideband Wireless Multimedia Access".

(List continued on next page.)

*Primary Examiner*—William Trost
*Assistant Examiner*—Stephen D'Agosta

(57) ABSTRACT

The invention relates to a multipath propagation delay determining means (STU, FIGS. 6, 7) for determining a power delay spectrum (DPS) of a CDMA signal transmission between a CDMA base station (BS) and a CDMA mobile station (MS) on a plurality of propagation paths (P1, P2) within a cell (CL) of a CDMA communication system, comprising an A/D conversion means (A/D) for converting an analog CDMA multipath signal ($S_1, S_2$) received from at least one antenna (Ant1, Ant2) within said cell (CL) into a digital CDMA multipath signal ($S_1, S_2$) consisting of consecutive radio frames (RF1 . . . RFn) including consecutive time slots (TS1 . . . TSm) with complex pilot symbols (PSi) and data symbols (Pdi), a demultiplexing means (PI-DEMUX) for extracting complex pilot symbols (PSi) and data symbols (PDi) from at least two consecutive time slots (TSk−1, TSk, TSk+1) of each radio frame (RFn) and for storing them consecutively in a memory means (BUF) thereof; and a searching means (S1 . . . SL) for determining a power delay profile (DPS, DPS1, DPS2, FIG. 14) of said each antenna (Ant.1, Ant.2) on the basis of said extracted and stored complex pilot symbols and said data symbols (PSi, PDi).

41 Claims, 16 Drawing Sheets

U.S. PATENT DOCUMENTS

| | | | | |
|---|---|---|---|---|
| 5,267,261 A | | 11/1993 | Blakeney, II et al. | 375/1 |
| 5,406,593 A | | 4/1995 | Chennakeshu et al. | 375/120 |
| 5,414,699 A | * | 5/1995 | Lee | 370/342 |
| 5,414,734 A | | 5/1995 | Marchetto et al. | 375/267 |
| 5,490,165 A | | 2/1996 | Blakeney, II et al. | 375/205 |
| 5,533,063 A | * | 7/1996 | Mitra et al. | 348/614 |
| 5,602,832 A | | 2/1997 | Hudson | 370/342 |
| 5,648,983 A | | 7/1997 | Kostic et al. | 375/206 |
| 5,654,979 A | | 8/1997 | Levin et al. | 375/206 |
| 5,673,294 A | | 9/1997 | Namekata | 375/341 |
| 5,752,161 A | | 5/1998 | Jäntti et al. | 455/8 |
| 5,818,866 A | * | 10/1998 | Wilk | 375/149 |
| 5,818,876 A | * | 10/1998 | Love | 329/304 |
| 5,892,801 A | | 4/1999 | Schneider | 375/348 |
| 6,121,927 A | * | 9/2000 | Kalliojarvi | 342/453 |
| 6,185,251 B1 | * | 2/2001 | Fertner | 375/229 |
| 6,192,238 B1 | * | 2/2001 | Piirainen | 455/422 |
| 6,205,166 B1 | * | 3/2001 | Maruta et al. | 370/342 |
| 6,256,338 B1 | * | 7/2001 | Jalloul et al. | 370/342 |
| 6,370,397 B1 | * | 4/2002 | Popovic et al. | 370/342 |

OTHER PUBLICATIONS

Viterbi, A.J., "CDMA: Principles of Spread Spectrum Communication", Addison–Wesley Publishing Company, 1995, (pp. 11–37, 77–103).

Padgett, J.E., et al: "Overview of Wireless Personal Communications," IEEE Communications Magazine, Jan. 1995, pp. 28–41.

Baier, A., et al: "Design Study for the CDMA–based Third Generation Mobile Radio System," IEEE Journal on Selected Areas and Communications, vol. 12, May 1994, pp. 733–743.

Whipple, D.P.: "The CDMA Standard," Applied Microwave & Wireless, Dec. 1994, pp. 24–37.

Sousa, E.S., et al: "Delay Spread Measurements for the Digital Cellular Channel in Toronto," IEEE Transactions on Vehicular Technology, vol. 43, No. 4, Nov. 1994, pp. 837–847.

* cited by examiner

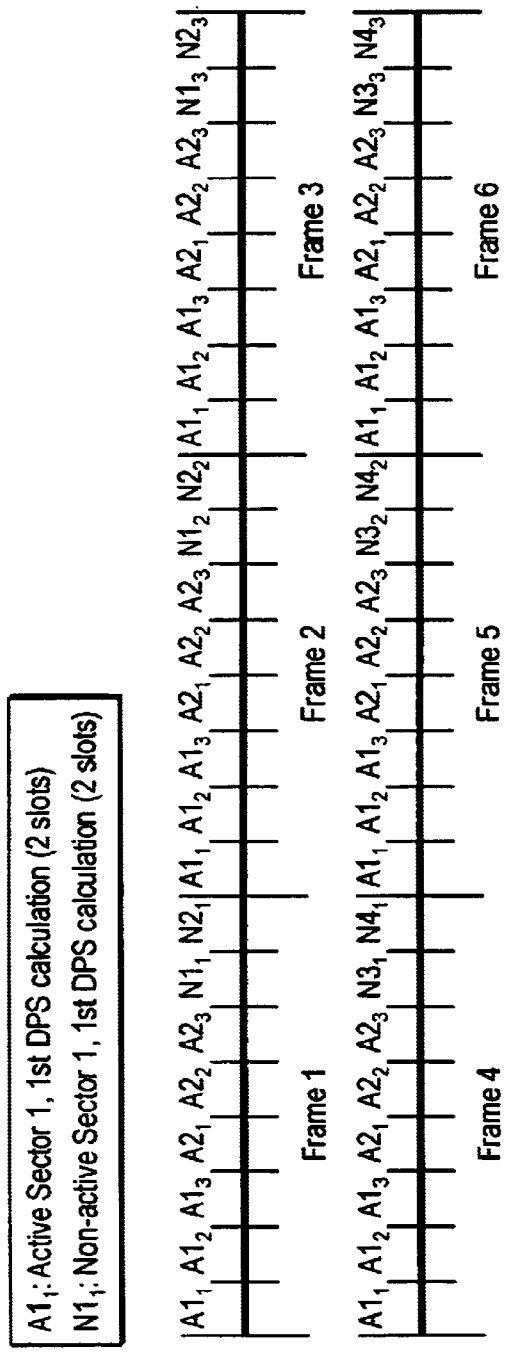
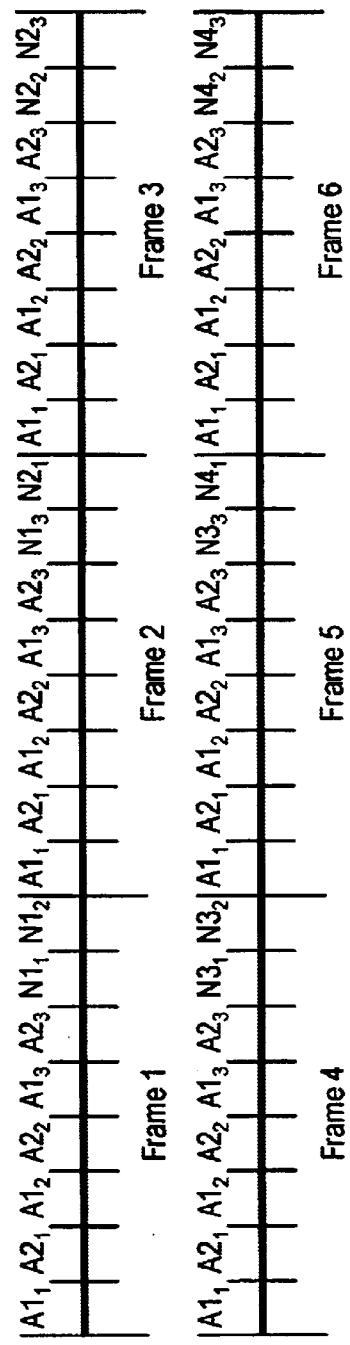
FIG. 13A
FIG. 13B

MULTIPATH PROPAGATION DELAY DETERMINING MEANS USING PERIODICALLY INSERTED PILOT SYMBOLS

This application is a continuation in part of U.S. Pat. No. 6,370,397, filed on May 1, 1998 as U.S. patent application Ser. No. 09/070,778.

FIELD OF THE INVENTION

The present invention relates to a multipath propagation delay determining means, in particular for a CDMA base station, in which pilot symbols contained periodically in the signal radio frames are used for an efficient power delay profile calculation and an improved path selection, tracking and sector selection.

In particular, the invention relates to performing the afore-mentioned functions in connection with a so-called RAKE receiver.

BACKGROUND OF THE INVENTION

Code-division multiple access (CDMA) based on direct-sequence (DS) spread-spectrum (SS) techniques is a prospective candidate for the third generation of wideband cellular mobile telecommunication systems (e.g. in UMTS, as IMT-2000 described in reference [1]: J. E. Padgett et al: "Overview of Wireless Personal Communications", IEEE Communications Magazine, January 1995, pages 28–41).

As shown in FIG. 1 an area, where several mobiles stations MS1, MS2 . . . MS are served by a (fixed) base station BS, can be regarded as a cell of the CDMA communication system. It has already been demonstrated that the DS-SS CDMA technique is capable of transmitting data signals of high transmission speed, for example within RACE CODIT project (reference [2]: A. Baier et al: "Design Study for the CDMA-based Third Generation Mobile Radio System", IEEE Journal on Selected Areas and Communications Vol. 12, May 1994, pages 733–743). The potential advantages of the DS-SS CDMA technique have also been tested in the Ericsson Wideband-Testbed (WBTB) project. DS-SS-CDMA has already been used in commercial systems like systems based on IS'95 (D. P. Whipple: "The CDMA Standard", Applied Microwave & Wireless, December 1994, pages 24–37). Also in Japan a great importance has been attributed to the DS-SS-CDMA system.

Whilst some basic properties of the CDMA receiver and the CDMA telecommunication system are implicit due to the CDMA method, special realizations of the despreaders, the searchers and path selection units have not been investigated in a great detail up to now, since a standard for the W-CDMA has so far not been established. Therefore, the present invention relates to special realizations of the individual units necessary in the CDMA-receiver. Since the inventive CDMA base station, the CDMA reception method and the CDMA system are intrinsically based on the DS-SS CDMA technique, hereinafter the basic technique of DS-SS CDMA transmission will be considered (see also the basic reference [4]: A. J. Viterbi: "CDMA: Principles of Spread Spectrum Communication, Reading, Mass.: Adison-Wesley, 1995").

DE 19506117 C1 describes a method for estimating the impulse response of a transmission channel, over which CDMA-method-coded information is transmitted. The information is spread on the transmitter side with a spreading code and is despreaded on the receiver side with a corresponding corelation code. The temporal changes of the propagation paths are taken into account on the receiving side.

DE 19615257 A1 describes a CDMA-RAKE-receiver including a sub-chip-resolution. This receiver is adapted for use in a DS-CDMA-communication system. It includes a channel estimation means which can resolve multipath-components, which are closer than a single chip-interval.

Basic CDMA-Technique

Basically, in the CDMA technique, an input signal I having a limited bandwidth (transmission speed) is spread with a predetermined spreading sequence (PN sequence) of a much higher bandwidth and thus an output signal O is produced having a much higher bandwidth than the input signal I as is shown in FIG. 2a. Since all signals considered in the CDMA technique are digital signals, the expression "bandwidth" really means the chip rate.

As is shown in FIG. 2b, two bits of a digital signal constitute one symbol in a CDMA method using a QPSK modulation. Each bit of the symbol will be spread with a PN sequence, and the spread signal (the bottom curve in FIG. 2b) consists of a plurality of "chips", whereby a chip is defined as a 0→1 and 1→0 (or 1→0 and →1) portion of the despread signal.

As indicated in FIG. 2a, a so-called spreading gain M equal to the ratio of the chip rate to the symbol rate is defined. M basically describes the spreading factor, i.e. how much wider the bandwidth has become due to the spreading with the PN sequence. Of course, since all signals are digital also the PN sequence is a signal which is digital (consisting of a number of bits).

If the original signal I has to be recovered in the CDMA receiver, of course a despreading process has to be carried out in a despreader DSP as shown in FIG. 2a, wherein the original information is obtained by multiplying the spread signal (sequence O) with the original PN sequence that was used for the spreading process.

However, as shown in FIG. 3, all information in the CDMA channels are transmitted clockwise, i.e. in terms of successive radio frames RFn. This means, that the spreading and despreading must be performed also framewise. In the transmitter, each frame is spread with the spreading sequence (PN sequence) starting with the beginning of the frame and of course this means that also in the receiver there must be a time synchronized (i.e. time-aligned) despreading, i.e. the despreading sequence must be aligned to the beginning of the received frame. The PN sequence is of course a sequence which is known to the transmitter and receiver, but the time-alignment for the block-wise (M) integration (despreading) must be performed in the receiver.

A principle overview of a base station receiver is shown in FIG. 4. As is seen in FIG. 4, the demodulator DEMOD receives inputs from the PN generator PN-GEN (generating the PN despreading sequence) and from a timing control unit TCU.

In principle, signals from various antennas Ant0, Ant1 from various sectors 1 . . . 6 are input to an automatic gain control circuit AGC and the samples are input to a so-called searcher S (the function of which will be explained below) which calculates the (power) delay profiles. The demodulator DEMOD (comprising a so-called RAKE receiver to be explained below in more detail) outputs the demodulated and despread bit sequence to the decoder DEC. As will be seen below, the searcher S actually comprises a searching and tracking unit provided for input signals from all sectors (parts of a cell as shown in FIGS. 1, 12). The output from the searcher S are the delay values and the (sector) selection information.

The reason why the searcher S also comprises a tracking unit results from the problem of multipath propagation which is an intrinsic property of any mobile communication system. Therefore, hereinafter the multipath propagation in connection with the tracking features of the CDMA system are explained.

CDMA Multipath Propagation

As shown in FIG. 5, between a mobile station MS and a base station BS there is not only the direct path P1 but also indirect paths P2, P3, for example due to reflections at buildings H, cars C or mountains M. This mixture of direct and indirect paths (i.e. multipath propagation) means that the received signal energy (i.e. the power per sample of the transmitted sequence) does not have a constant time delay (corresponding to the velocity of light). This means, that a sample (bit) transmitted at $t_0$ arrives at the base station BS at the time $t_1$ and another portion of the energy arrives at the base station BS at time $t_2$ due to a further propagation of the energy along an indirect path P2 or P3. This leads to the delay profile per sample as is illustrated in FIG. 5. That is, each sample is spread over the delay profile, often characterized by (fading) single paths. Thus, in FIG. 5 the time differences $t_1-t_0$, $t_2-t_0$ etc. are defined as delays $d_1$, $d_2$ etc.

In conventional DS-SS-CDMA techniques the problem of multipath propagation is usually handled by the so-called RAKE receiver as is described in the afore mentioned references [2] and [3]. The basis of the RAKE receiver is basically to collect the energy per symbol not only from the direct path P1 but also from the plurality of indirect paths P2, P3. Essentially the RAKE receiver allocates a "marker" (in CDMA such markers are called "fingers") to the strongest single paths (i.e. to the maxima) in the delay profile of the corresponding signal. Thereafter, the collected energy or the information of each path is individually demodulated/detected per path (i.e. per RAKE finger). Thereafter the information after demodulation is combined, e.g., with a maximum-ratio-technique.

If the mobile station MS with respect to the base station BS was stationary, then of course the delay profile with respect to also stationary reflection objects H, M could be pre-estimated and calculated. However, one of the intrinsic properties of a mobile radio communication network is the "dynamic" variation of the delay profile when the mobile station MS or one of the non-stationary objects C move. Therefore, also the delay profile exhibits a dynamic characteristic. Thus, the resource allocation and the time synchronization of the RAKE receiver has to be performed by continuously estimating and evaluating the delay profile.

In the CDMA technique a so-called searching and tracking unit is normally used to identify the paths within a delay profile.

Searching and Tracking Unit

A major task of the searching and tracking unit is to identify the paths within a delay profile and keep track of changing propagation conditions, e.g. as a consequence of distance variations between the mobile station MS and the base station BS. Since in the base station receiver the despreading sequence must be fully time-aligned to the sample (energy) arriving at the base station BS along a plurality of paths, it is essential that the searching and tracking unit knows the relative delays $d_1$, $d_2$, ... $d_p$ of the paths within the delay profile. If so, the requested time-synchronization for each RAKE finger can be maintained. Therefore, the searching and tracking unit must on the one hand estimate the delay profile and on the other hand must assign the RAKE fingers accordingly in order to time-align the PN despreading sequence to the exact arrival time of the partial sample energy arriving over each individual path.

Often a certain frame structure with fixed alignment of information signal (frames) and spreading sequences is applied and therefore the time-synchronization can be split up into a frame-synchronization and chip-synchronization. As a consequence of fading and changing propagation conditions the estimation of the delay profile carried out by the searching unit has to be updated according to the specific needs of the mobile radio channel.

Therefore, the searcher has to fulfill two contradictory requirements, namely, on the one hand it must minimize the time needed for updating or calculating the exact delay profile and on the other hand it must provide a sufficiently fine time resolution for time-aligning the PN despreading sequence to the beginning of the respective frame or symbol, i.e. to minimize the self-noise of the PN sequence.

Conventional Searching and Tracking Unit

Prior art searcher algorithms and implementations in communication applications mainly relate to IS-95 (commercial) systems, either for the up-link (MS→BS) as described in reference [4] and reference [5]: K. Easton and J. Levin: "Multipath Search Processor for a spread Spectrum Multiple Axis Communication System", WO 96/10873, Apr. 11, 1996" or for the down-Link (BS→MS) in reference [6]: R. Blakeney et al "Demodulation Element Assignment in a System Capable of Receiving Multiple Signals, WO 95/12262, May 4, 1996".

As already shown in FIG. 3, each superframe SRF consists of a number of radio frames RFn which each consist of a number of time slots TSm. Each time slot TSm has a number of pilot symbols PS2 which allow to detect the beginning of the time slot TSm. Therefore, the pilot symbols can be used in order to achieve the time-aligning of the PN despreading sequence to the beginning of the individual time slots.

In order to achieve a high system capacity, the prior art according to the IS-95 systems do not use pilot symbols in the up-link channel. If the pilot symbols are not contained, the searchers must examine all possible signal variations which random data can produce and perform the delay profile calculation on the basis of such an estimation. In the downlink channel for example in the Ericsson WBTB system a continuous pilot signal is inserted. The up-link delay estimation is based on a decision feedback.

Prior Art Searching and Tracking Unit

As described in WO 96/10873 a typical receiver uses multiple searcher elements working in parallel to provide a fast searching process. Such a searching and tracking unit comprising a plurality of searchers S is shown in FIG. 6. As shown in FIG. 6, a plurality of searchers S1 ... SL work in parallel as a consquence of the multiple signal sources (antennas from each of the sectors 1 ... 6) which should be examined. The parallel operation is also a consequence of the "real time" requirements. Namely, if a real-time serial search is applied, for each new time offset, (code phase imcrement since in the CDMA method each channel is identified by a respective time offset to a synchronization pulse) an additional correlation (dwell) time must be spent.

To avoid this "real-time slavery", WO 96/10873 suggests a new hardware architecture for the searcher. The essence of the new searcher architecture is to de-couple the operation of the correlator (based on a Fast Hadamard Transform-FHT processor) from the real time requirements by introducing a buffer for the input signal samples and a PN sequence buffer for the despradring sequences. In this way the FHT processor can run at much higher speed evaluating quickly the large number of time offsets with respect to the reference (synchronization) signal. In WO 96/10873 an efficient technique for supplying high speed data streams to the FHT processor is included. The hardware architechture is similar to the one implemented within CODIT and the WBTB test project of Ericsson. The WBTB approach can further be described as a combination of coherent accumulations with non-coherent averages in order to reduce the variance of estimates.

Path Selection Unit

As is also shown in FIG. 6 for the conventional system (see for example WO-96/10873) in addition to the parallel working searchers S1 . . . SL there is a path selection unit PSU that selects the individual paths from the calculated power delay profiles as determined by the set of searchers. As is seen in FIG. 5, the delay profile has a number of peaks and the path selection is conventionally done by scanning the calculated delay profile for a certain number of strongest peaks, whereafter these peaks are compared to a threshold, which is derived by multiplying the "noise floor" of the delay profile with a constant value.

The disadvantage with such a kind of path selection is that it is not very accurate, in particular when cells are used, which are subdivided into sectors, and when multiple antennas per sector (antenna diversity) is used.

SUMMARY OF THE INVENTION

As described with reference to FIG. 3 above, each time slot comprises a number of pilot symbols and over the successive time slots it may be said, that the pilot symbols are periodically inserted (after each 0.625 ms). Each logical channel (information) corresponds to one voice or packet data channel. In a commercially interesting system up to 300 voice channels per base station must be handled simultaneously. This means, that each voice or packet data channel has to simultaneously undergo the delay profile estimation and the updating of the delay profile simultaneously for which the PN despreading sequence must be appropriately time-aligned to the beginning of the respective time slot.

The above described solution of estimating the absolute delays is not optimal for the CDMA systems with periodically inserting pilot symbols. On the other hand, another solution suggested in the Ericsson WBTB project proposes that a long buffer is used that is able to reflect all possible delay values within a cell. The hardware in such a system is extremely complex when 300 voice channels per base station need to be handled, since essentially 300 parallel working searchers must be provided.

OBJECT OF THE INVENTION

Therefore, a first aim of the invention is to provide a multipath propagation delay determining means, in particular for the DS-SS-CDMA base station receiver where no complex hardware is necessary for the searchers, whilst still an accurate estimation of the power delay profile for a high number of voice channels can be achieved in real time.

As also described above, one of the most important general problems is to select the individual paths from the delay profile, since the estimation of the delay values is necessary in order to solve the problem of the multipath propagation. In the conventional path selection unit a threshold is set for the discrimination between the signal and the noise. Furthermore, reference [7]: E. S. Sousa, V. M. Jovonvich and C. Daigneault, "Delay Spread Measurements for the Digital Cellular Channel in Toronto", IEEE Transactions on Vehicular Technology, Vol. 43,. No. 4, pages 837–847, November 1994" contains a description of a modified threshold setting method for the channel delay profile estimation using a so-called constant false alarm rate technique (CFAR). However, this method is extremely complex and is more suitable for off-line signal processing and does not fulfill the requirements of the real-time implementation in a commercially interesting CDMA telecommunication system.

Therefore, another aim of the invention is to provide a multipath propagation delay determining means, in particular for a DS-SS-CDMA base station receiver, in which an accurate path selection estimation in a real-time application can be performed.

Furthermore, as described above, in the CDMA system cells may be subdivided into sectors and multiple antennas may be used per sector (antenna diversity). Thus, the accuracy of the delay profile estimation and the treatment of the softer (i.e. sector-wise) handover has to be specified and optimized with respect to the special requirements of a hardware with as low complexity as possible.

Therefore, a further object of the invention is to provide a multipath propagation delay determining means, in particular for a DS-SS-base station receiver, allowing an accurate delay profile estimation and a softer handover when cells are subdivided into sectors in which an antenna diversity is used.

The above aims can be summarized in a single object of the invention, i.e. to provide multipath propagation delay determining means, in particular for a DS-SS-CDMA-base station receiver, in which a great number of voice or packet data channels with periodically inserted pilots symbols can undergo in real-time simultaneously an accurate despreading, an accurate delay profile estimation as well as an accurate path selection and location determination.

Solution of the Object

The above object is solved by a multipath propagation delay determining means, for a CDMA base station receiver.

Essentially, as a primary aspect of the invention an improved power delay profile is calculated according to the invention by averaging delay profiles estimated over a plurality of successive time slots and frames. Further aspects of the invention are claimed in the dependent claims.

One preferred aspect of the invention is how the delay profile is searched for local maxima corresponding to the individual paths. Here, the peaks in the profile are removed or equivalently set to 0 to obtain a noise floor. This noise floor is averaged to result into a single value. Then a threshold factor is multiplied with this noise floor level. Then the original unmodulated delay profile is compared with the multiplied value and those maxima are selected as useful paths which lie above the multiplied value threshold.

Another aspect of the invention is the usage of an antenna diversity, i.e. two antennas in each cell or sector each providing a delay profile. Here the two delay profiles from each antenna are added and only such peaks are selected in this added profile which lie above the multiplied threshold value. Then the two delay profiles are compared separately with the multiplied threshold detected for the combined delay profile and only such paths are selected for a single antenna signal that also lie above the threshold within the respective single delay profile. The correlated evaluation of the delay profile for the path selection based on two delay profiles simultaneously is completely different to an individual consideration of the delay profiles of each antenna.

According to another aspect of the invention each cell is divided into several sectors each served by two antennas using antenna diversity. Whilst in the prior art an information must be transferred to the base station as to which sector contains the mobile station, an aspect of the invention uses a "dynamic searching of the sectors" combined with individual path selections and a highly accurate softer handover. A "location" determination of the mobile station MS can be performed based thereon.

Further advantageous embodiments and improvements of the invention may be taken from the dependent claims. Hereinafter, the invention will be described with reference to its embodiments in combination with the attached drawings.

BRIEF DESCRIPTION OF THE DRAWINGS

In the drawings:

FIG. 13 shows a diagram how sectors of a cell are dynamically searched according to a search method of the invention;

In the drawings the same or similar reference numerals denote the same or similar parts throughout. Hereinafter, embodiments of the invention will be described with reference to the attached drawings.

UNDERLYING PRINCIPLE OF THE INVENTION

Figure 4:
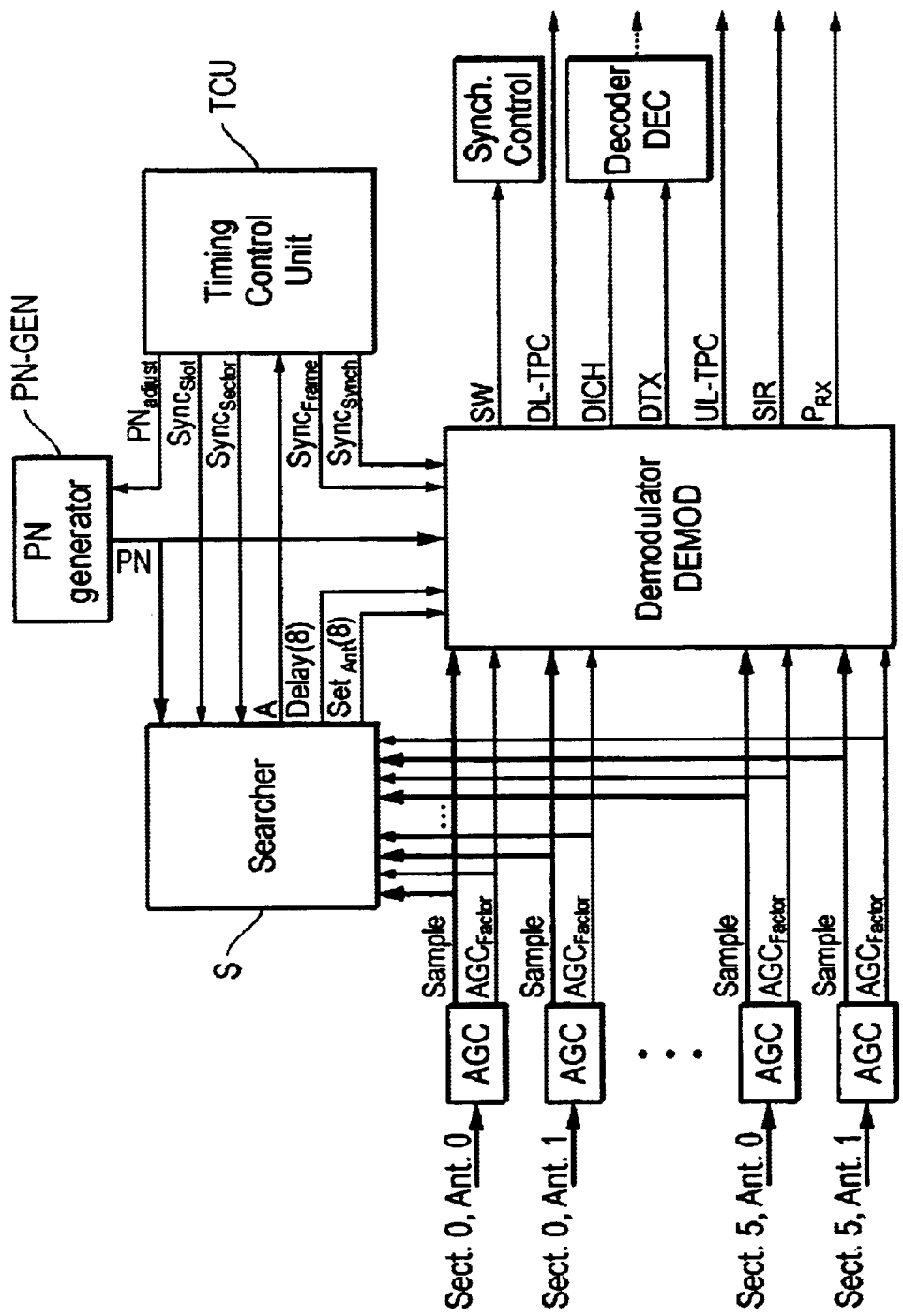
FIG. 4 shows a block diagram of a conventional base station receiver.
Figure 5:
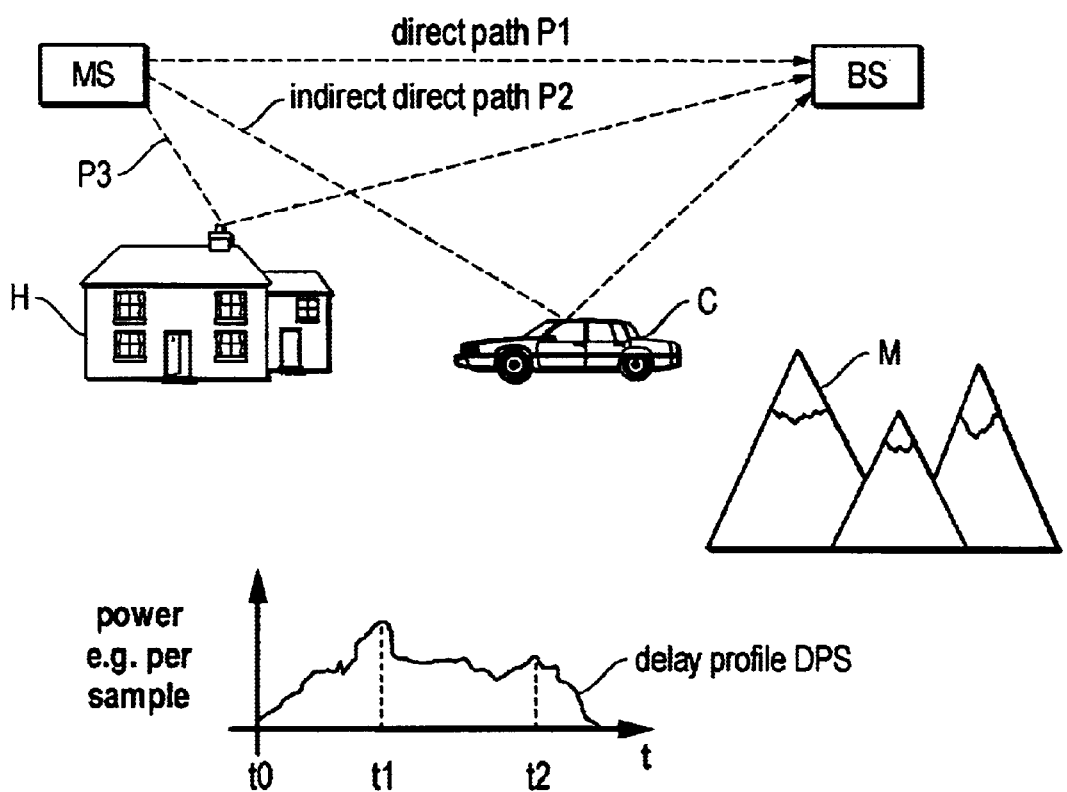
FIG. 5 shows a delay profile DPS and the problems of multipath propagation.

As already explained with reference to FIG. 4, the RAKE receiver RR is used for handling the multipath propagation in DS-CDMA systems. A RAKE receiver should be able to capture most of the received signal energy by allocating a number of parallel demodulators (fingers) to the selected strongest components of the multipath signal received from the antenna. The outputs of all fingers (demodulators) are combined after the corresponding delay compensation.

The allocation and time synchronization of the demodulators (fingers) are performed on the basis of an estimated channel response. The multipath delay search processor (hereinafter called a searcher) function is to estimate the channel power delay profile, to identify the paths within the delay profile and to keep track of changing propagation conditions. Thus, the multipath delay search processor has to fullfil the two contradictory requirements of minimizing the search time and on the other hand to have sufficiently fine time resolution in order to minimize the PN sequence self-noise.

The channel impulse response is estimated within a certain search window defined by the number of spreading code phases which should be searched to cover the maximum expected delay spread. The channel impulse response estimation is repeated within a certain interval called the update time.

The update time has to be sufficiently small, such that the delay variations of the radio channel can be tracked. The position of the channel impulse response within the search window is changing due to the movement of the mobile station as well as the clock frequency mismatch between the PN sequence generators in the transmitter and the receiver. Therefore, the overall position of the search window has to be adjusted to keep the channel impulse response in the middle of the search window. When the multipath delay search processor (the searcher) has a fine enough resolution, the other code tracking devices, usually implemented in each of the RAKE single path demodulators, are not needed.

The searching and tracking unit STU (see the attached FIG. 6) of the RAKE receiver (see FIG. 4) is to maintain the chip and frame synchronization for the RAKE receiver. Therefore, the delay profile of the received signal due to the multipath propagation has to be estimated. As a consequence of fading and changing propagation distances, i.e. distance variations between the mobile station MS and the base station BS, this estimation has to be updated according to the specific needs of the mobile radio channel.

Hereinafter an embodiment of the invention is described, where the delay profile of the received signal is estimated with an excellent resolution within a certain search window corresponding to the delay spread. The delay profile estimation may be repeated within a certain intervall, i.e. within the update time. The update time is choosen to be sufficiently small, such that delay variations of the radio channel can be tracked. Therefore, no explicit tracking needs to be provided. Only the overall position of the search window has to be adapted (tracked) to distance variations between the mobile station MS and the base station BS. Thus, the searching and tracking unit STU can be used to assist the sector selection and softer handover, since the sector-assigned delay profiles can be used to reveal where the most signal energy can be captured within the sectors.

In the following it is assumed that any initial sector selection, initial frame and initial chip synchronization has already been established (e.g. during random access signal reception). However, these constraints are no principle limitation to this method and the method according to the invention can also be used for this purpose by some adaptations.

Embodiment of the Searching and Tracking Unit

Figure 6:
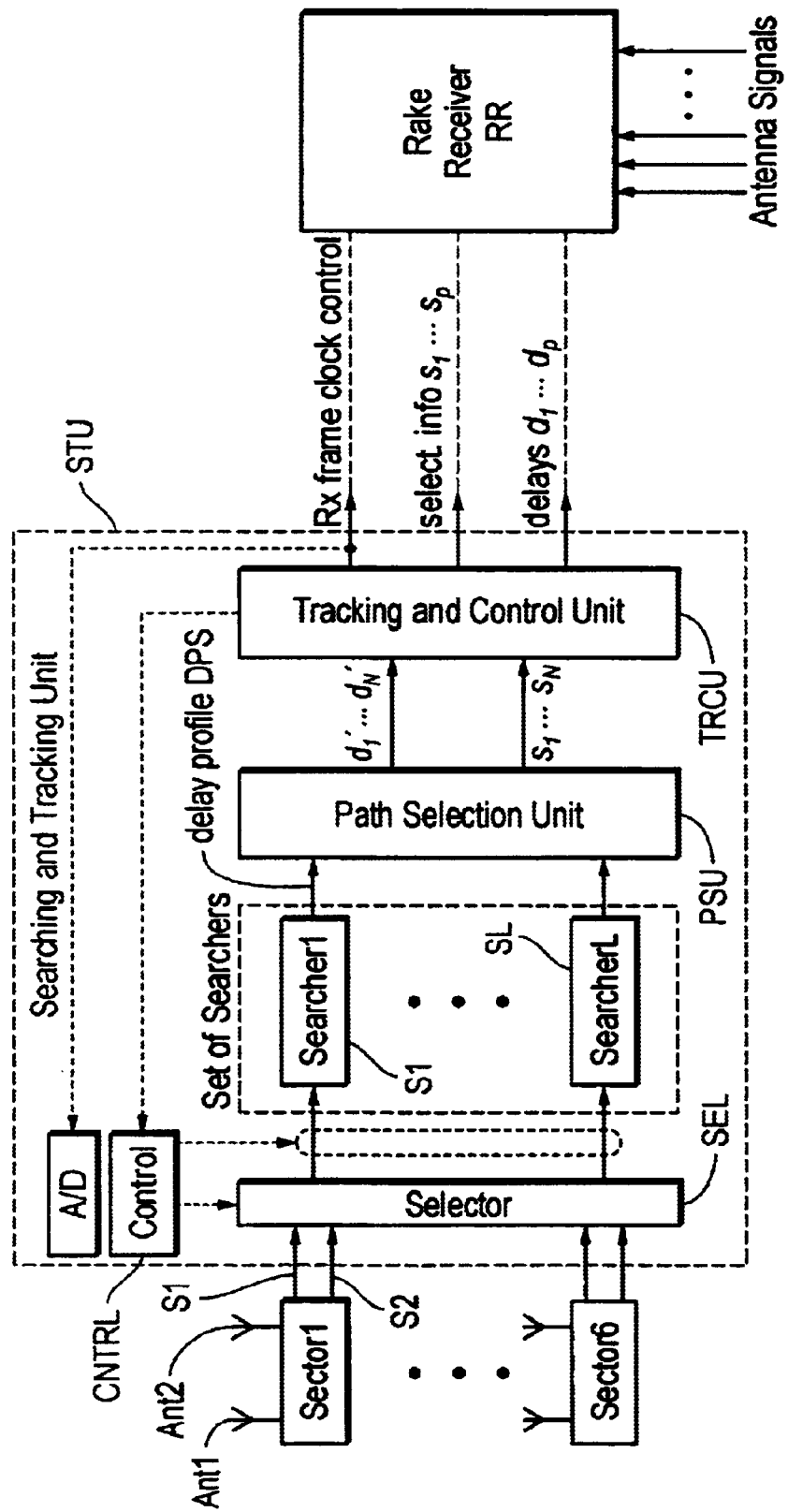
FIG. 6 shows the block diagram of a searching and tracking unit STU used in the invention.

The searching and tracking unit STU of the invention as shown in FIG. 6 comprises a selector SEL to which two signals S1, S2 received from the antennas Ant1, Ant2 of each sector 1 . . . 6 are input. The inputting of two signals S1, S2 to the selector SEL is made, because an antenna diversity technique using two antennas Ant1, Ant2 is preferably used in each sector. However, it should be understood that the invention is not restricted to the antenna diversity in its broader sense and that it is also possible to perform the input of one signal S from one antenna of each sector into the selector SEL.

Figure 3:
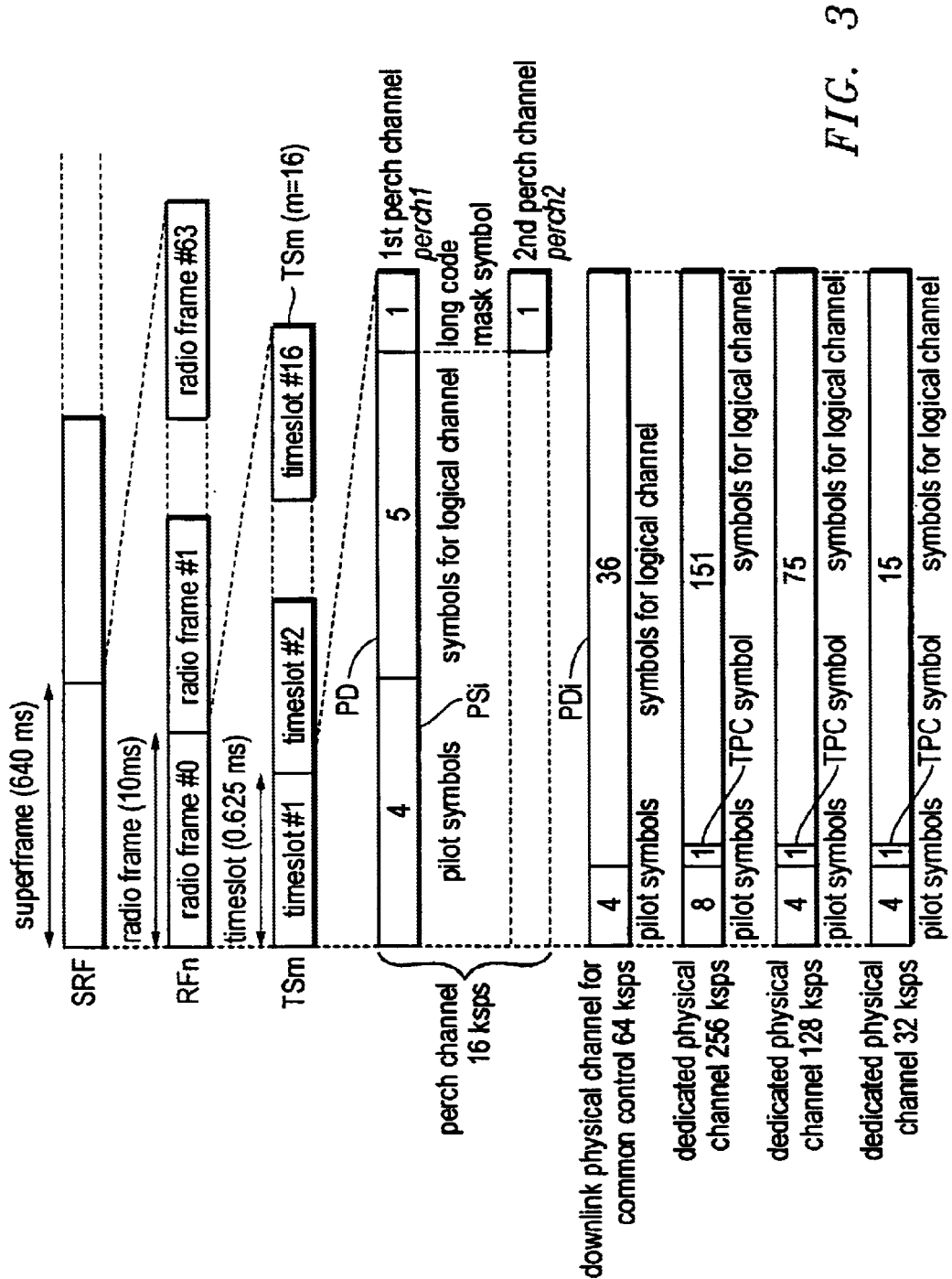
FIG. 3 shows channel formats with periodically inserted pilot symbols in a CDMA transmission channel.
Figure 11:
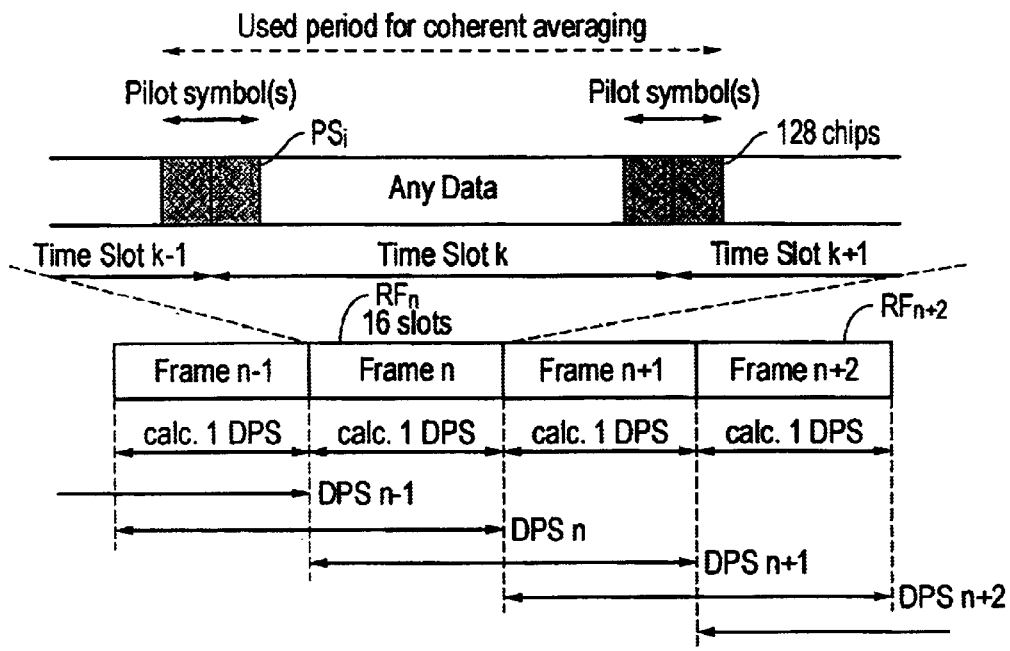
FIG. 11 shows the usage of pilot symbols and frames and the used time period for performing a coherent averaging in the coherent accumulation/averaging means ACC-AV shown in FIGS. 7, 9, according to the invention.

Of course the signal actually received from the antennas is an analog signal. An A/D converter A/D is arranged in the STU means to convert the analog CDMA signal into a digital CDMA signal. As shown in FIGS. 3, 11, this digital CDMA signal comprises consecutive radio frames RF1 . . . Rfn including consecutive time slots TS1 . . . Tsm into which the complex pilot symbols PSi and the data symbols PDi are inserted. The A/D converter stands for carrying out all the usual functions like analog-digital conversion, matched filering, etc. and can be located in the STU means, e.g. in the selector SEL, between SEL and the sector antennas or before or within the searchers S1 . . . SL.

Whilst on the transmitter a digital transmission signal including a plurality of bits is first convolutionally coded per bit, e.g. with a rate r=1/3, then 2 of the convolutionally coded bits are combined as a QPSK symbol (Q, I) and then this symbol is spread with the transmitter side PN sequence, the receiver, e.g., RAKE and the searchers must likewise despread the symbols with the corresponding despreading sequence. This is the basis of direct sequence CDMA (i.e. including a QPSK modultation). It is noted that other modulation schemes can be used to obtain the symbols to be spread. Therefore the invention is not restricted to the usage of QPSK modulation.

The selector SEL functions to extract the blocks of signal samples to undergo a search in the multipath delay search processors S1 . . . SL (hereinafter called the searchers S1 . . . SL). Essentially, the respective selector SEL extracts the pilot symbols plus some additional samples (symbols for logical channels) out of the data streams received from the respective antenna. The frame format and the pilot symbols are illustrated in FIG. 3. The extraction of the pilot symbols plus the additional samples takes place preferably at a sample rate of 16.38 Mega samples per second, essentially at an oversampling rate, for example 4.

The searching and tracking unit STU in FIG. 6 comprises a number of searchers S1 . . . SL, wherein L may be the same number as the number of sectors or not.

Essentially, the extracted pilot symbols plus the additional samples are distributed to the set of L searchers according to a specified but flexible sector selection schedule. With the sector selection schedule the number of searchers can be different or the same as the number of sectors. Preferably six searchers operate at the sample rate. On the basis of the block of signal samples the extracted pilot symbols plus the additional samples (i.e. the demultiplexed and buffered antenna signals) deliver a separate delay profile DPS for each antenna signal to the path selection unit PSU according to the sector selection schedule.

According to the invention, the searchers S1 . . . SL perform a channel delay estimation (the determination of the delay profile) basically by a (pilot symbol based) combined coherent and non-coherent searching (and tracking) procedure with optional interleaving as will be further described with respect to the searcher S1 in FIG. 7. Preferably, the delay profiles DPS are updated at a minimum update time and preferably use a predetermined number of samples of the pilot symbols.

The path selection unit PSU receives the delay profiles DPS from the searchers S1 . . . SL and calculates out of the estimated delay profiles DPS an interference estimate (this interference comprises multi-user interference as well as thermal noise power interference), which is used for the succeeding path selection. From the delay profiles DPS essentially an interim number of N (preferably 8) paths $d_1'$ . . . $d_N'$ (i.e. delay values) and corresponding sector selection information $s_1'$ . . . $s_N'$ is determined by the path selection unit PSU. The selection information $s_1'$ . . . $s_N'$ indicates the sector number (1 . . . 6) and the antenna number in the respective sector (if an antenna diversity is not used in each sector, then this number may be omitted).

Whilst the delay values $d_1'$ . . . $d_N'$ still indicate an interim number of N (e.g. 8) paths, the tracking and control unit TRCU performs the final sector selection and generates a final number of (maximum) P (e.g. 8) delay path and selection information (i.e. delay values and corresponding selection information) that is transmitted eventually to the RAKE receiver RR. Thus, as is seen in FIG. 6, the tracking and control unit TRCU outputs the final number of delay path $d_1$ . . . $d_P$ and the final selection information $s_1$ . . . $s_P$ for the final number of paths that should be demodulated and decoded in the RAKE receiver i.e. the paths to which the RAKE should allocate its fingers. In addition, the tracking and control unit TRCU generates the number of clock control signals for tracking the search windows and cells for maintaining frame synchronization.

Thus, the antenna signals are input to the selector SEL which applies the respective signals from the antennas to a number of searchers, which calculate a delay profile for each of the applied input signals. Thereafter, the path selection unit selects a number of most promising paths and selection information regarding the sector and the number of the antenna. The final tracking and control unit determinates the final paths together with the appropriate selection information, such that the RAKE receiver RR is supplied with selection information and delay information which it can then use for demodulation.

Figure 1:
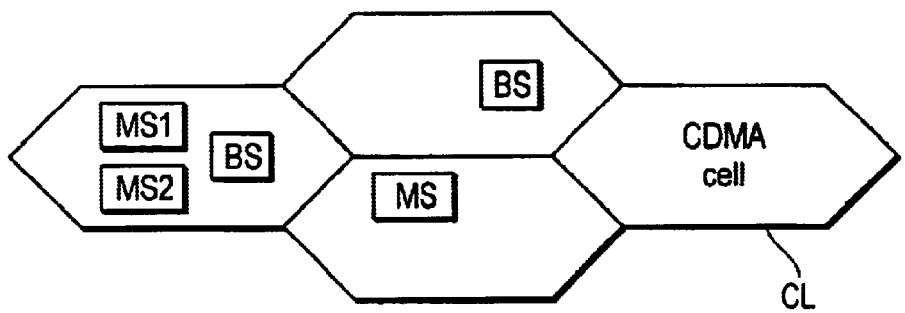
FIG. 1 shows the typical arrangement of CDMA cells and mobile stations MS and base stations BS according to the prior art.
Figure 2A:
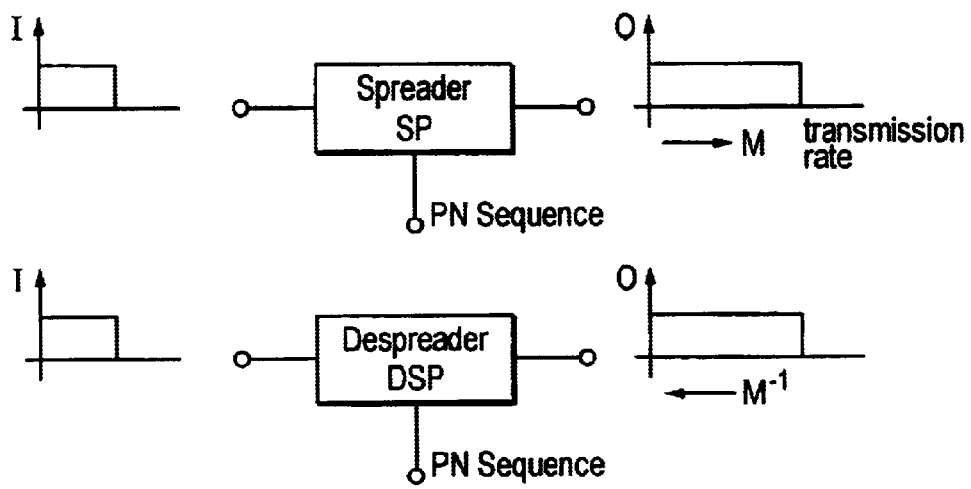
FIG. 2a shows the principle idea of the DS-SS CDMA spreading and despreading using a PN sequence.
Figure 2B:
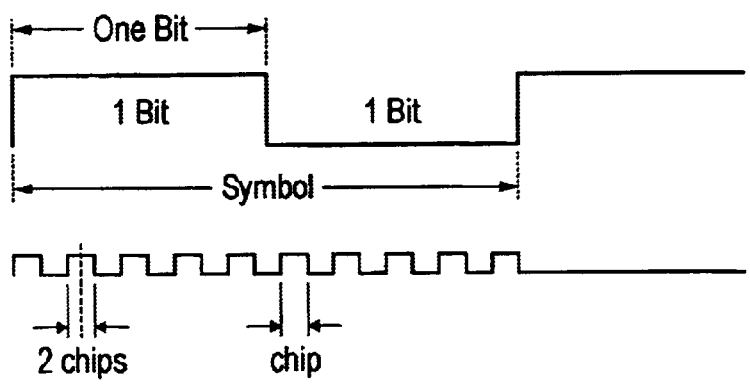
FIG. 2b shows the definition of symbol, bit and chip in a CDMA method using QPSK.

Hereinafter, specific embodiments according to the invention for the selector SEL (FIGS. 7, 8), the searcher S1 . . . SL (FIG. 7), the path selection unit PSU and the tracking and control unit TRCU (FIG. 10) as well as a specific embodiment of the despreader DESP and the coherent accumulation and averaging unit ACC-AV (FIG. 9) will be described for a frame format as shown in FIG. 3, FIG. 1.

Embodiment of the Selector Unit

Figure 7:
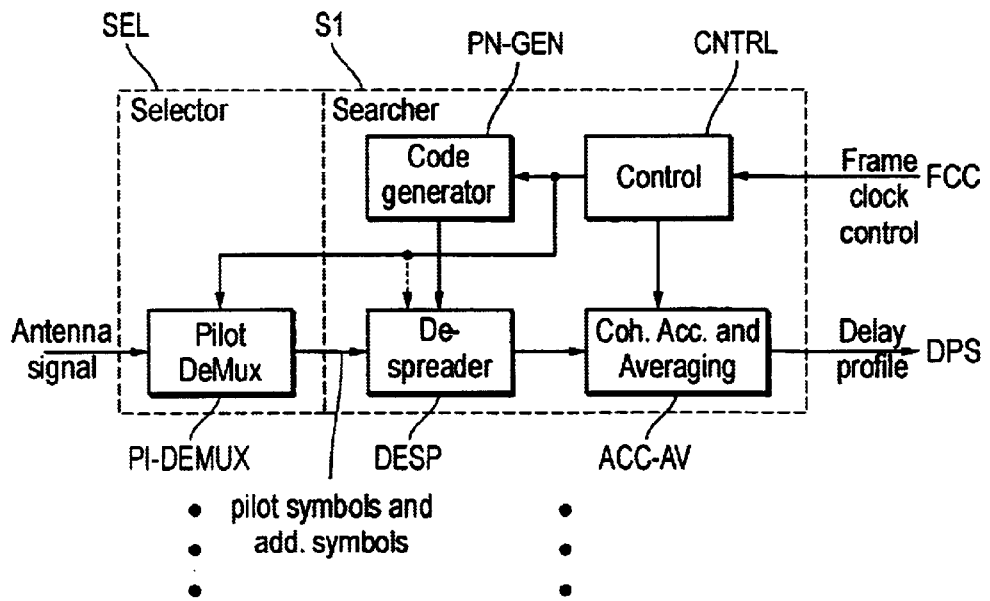
FIG. 7 shows an embodiment of the selector SEL and the searcher S1 shown as part of the searching and tracking unit STU in FIG. 6, according to the invention.

FIG. 7 shows an embodiment of the selector SEL. The selector comprises a so-called pilot demultiplexer PI-DEMUX. FIG. 7 shows the case where one antenna signal is input to the pilot demultiplexer PI-DEMUX, but it should be understood, that according to the control signals received from the control means CNTRL, different antenna signals from different sectors may be successively applied to the selector SEL.

The primary function of the pilot demultiplexer PI-DEMUX is to extract and buffer the periods of (consecutive) pilot symbols plus an additional number of samples out of the antenna signals which are constituted by input data streams of complex values. Considering for example in FIG. 11, that for the calculation of one delay profile DPS (calc. 1 DPS) the radio frame n of the antenna signal is evaluated, then this frame n consists of a number of consecutive time slots k−1, k, k+1.

As already indicated in FIG. 3, at the transition from one time slot to another, for example from time slot k−1 to time slot k, there are a set of pilot symbols PSi consisting of pilot symbols of the previous time slot k−1 and of the pilot symbols of the present time slot k. The difference between FIG. 3 and FIG. 11 is that in FIG. 3 the pilot symbols PSi are assumed to only lie at the beginning of the time slot whilst in FIG. 11 they lie at the beginning and the end of each time slot. Since it can anyway not be guaranteed that the time slots are already time-aligned to the PN sequence generated by the PN generates in the despreader DEsP it does not matter whether the sampling and extraction extracts pilot symbols at the beginning or the end only (it is a pure matter of convention where they lie) as long as it extracts a number of pilot symbols and data symbols that can be evaluated with respect to the PN despreading sequence. In between the sets of pilot symbols any data may be present, for example the symbols for the logical channel etc. as indicated in FIG. 3.

Now, what is meant with extracting the periods of pilot symbols is in fact the extraction of the pilot symbols (the shaded areas in FIG. 11). Preferably, 2 M chips (2 M×oversampling rate samples, e.g., 2×128=1024 samples) are extracted as pilot symbols. Preferably, additional 160 samples (the delay spread) are extracted from the antenna signal (the complex input data streams). Thus, the DPS to be calculated will eventually consist of 160 real power delay spectrum sample values.

Therefore, for the delay profile (search window) estimation, 160 samples at a resolution of four samples per chip are used, i.e. a delay spread of 160/16.38 Mega samples per second≈10 μs is evaluated. Preferably, it is also assumed that the minimum update time is 10 ms (i.e. one radio frame) for recalculating the delay profiles of the currently active sectors (i.e. a pre-defined number of sectors, where currently the most signal energy is found) and an update time of 60 ms for scanning the non-active (i.e. the other) sectors and for selecting the antenna signals (i.e. re-assigning active and non-active sectors).

Thus, at least in every radio frame of 10 ms (see FIG. 3) the delay profile is recalculated on the basis of the number of pilot symbols (1024 samples) plus the additional 160 samples, e.g., 8 times based on 2 timeslots). The additional samples are any kind of data, i.e. control data or voice data. Depending on the starting timing of extraction, of course there are cases where first pilot symbols and then data symbols, first data symbols (from the preceding time slot) then pilot symbols and then again data symbols or first only data symbols and then only pilot symbols are extracted.

As is seen in FIG. 7, in response to the frame clock control FCC the control means CNTRL controls the PI-DEMUX of the selector SEL such that it starts extracting the pilot symbols and the additional symbols at the correct timing within the time slots k−1, k, k+1 of the respective frame n.

Figure 8:
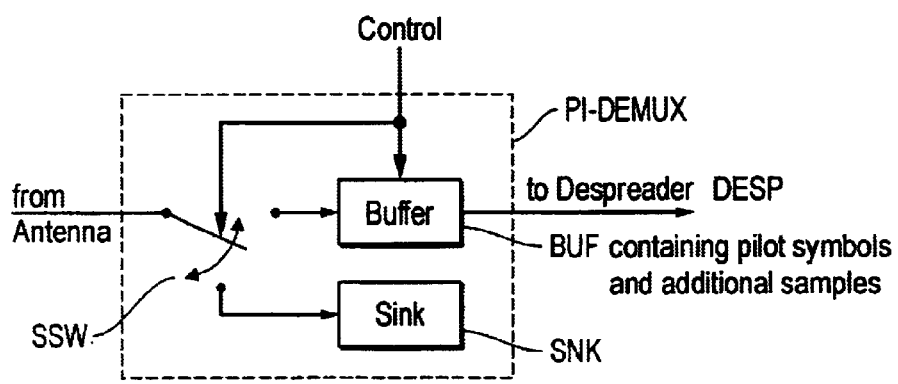
FIG. 8 shows an embodiment of the pilot demultiplexer PI-DEMUX shown in FIG. 7, according to the invention.

FIG. 8 shows an embodiment of the pilot demultiplexer PI-DEMUX. The control signal from the control means CNTRL controls a sample switch SSW, which applies the data from the antenna signal either to the buffer BUF or to a sink SNK.

Thus, via the frame clock control signal FCC the buffer BUF will contain successively the respective number of pilot symbols plus the additional samples. Any other data is applied to the sink SNK.

Thus, the positioning of the sample switch SSW (i.e. the read pointer) and the writing pointer, i.e. the positioning of the search window within the overall delay profile and equivalent to inserting or removing samples from the data streams, are controlled via the frame clock signals FCC.

As already mentioned, the control means CNTRL in combination with the tracking and control unit TRCU applies control signals to the selector SEL for a sector selection of active and non-active sectors according to a specific sector selection schedule and furthermore it controls the specific assignment of searchers S1 . . . SL to the demultiplexed antenna signals. Such a sector selection scheduling procedure may preferably be constituted as shown in FIG. 13 (to be explained below).

As described above with reference to FIGS. 7, 8, the primary function of the selector SEL is to respectively extract a number of pilot symbols plus a number of additional samples within each radio frame RFn and to successively apply these extracted data values to the subsequent searcher for the calculation of the delay profile (wherein a sector selection and antenna selection control for providing antenna signals successively from several antennas in several sectors to individual searchers by the demultiplexer PI-DEMUX is performed). Thus, the succeeding delay profile calculation in the set of searchers is based on the extracted pilot symbols and the extracted additional symbols.

Preferably, the number of the pilot demultiplexers is the same as the possible number of applied antenna signals, e.g. for the example in FIG. 6 there may be 12 pilot demultiplexers PI-DEMUX. However, the number can also be reduced, for example to the pre-defined number of active sectors according to the sector selection control, if timesharing with a corresponding intelligent control is used. Essentially at least one pilot demultiplexer would suffice.

Embodiment of the Multipath Delay Search Processor (Searcher)

Figure 9:
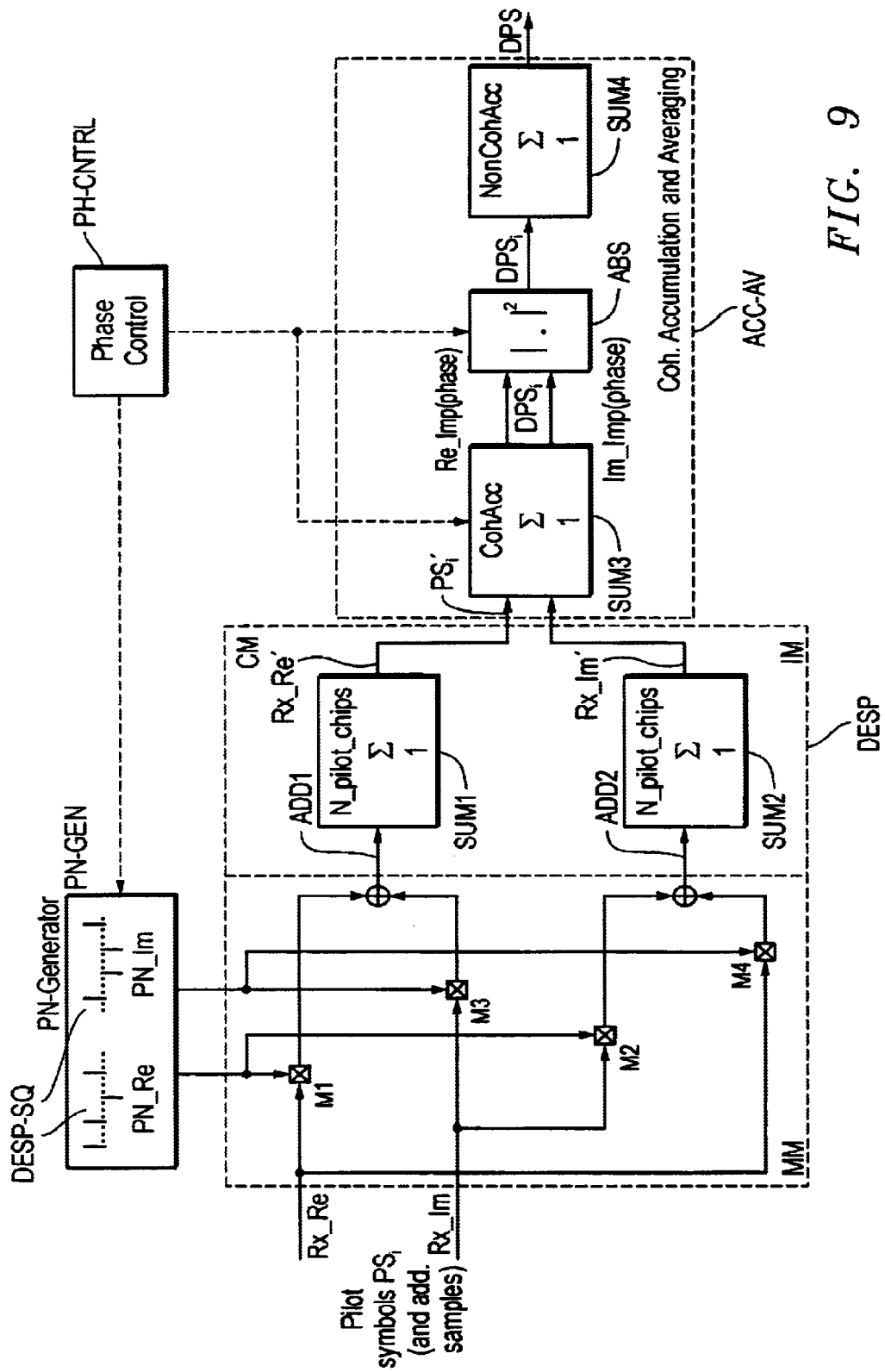
FIG. 9 shows an embodiment of the despreader DESP and an embodiment of the coherent accumulation/averaging means ACC-AV of the selector S1 shown in FIG. 7, according to the invention.

As explained above, the output data from the selector (i.e. the output of the buffer BUF in FIG. 8) are the consecutive complex pilot symbols plus the additional samples (for example 2*128 chips=1024 samples plus 160 samples) from one particular antenna signal as designated by the control means CNTRL. Hereinafter, the data output by the pilot demultiplexer PI-DEMUX (i.e. the complex pilot symbols plus the additional samples) will be referred to as "demultiplexer output data". As is seen in FIG. 9, of course the individual demultiplexer output data values comprise a real and an imaginary part Rx_Re and Rx_Im.

As already indicated in the embodiment for the searcher S in FIG. 7, the searcher comprises a PN-code generator PN-GEN generating the despreading sequence to be used in the despreader DESP for despreading the respective demodulator output data. The code generator PN-GEN and the despreader DESP as well as the multiplexer PI-DEMUX are controlled in response to the frame clock control signal FCC processed by the control means CNTRL. Through this control it is ensured that the PN generator despreading sequence is time-aligned and—for the calculation of the delay profile DPS—shifted to the respective extracted demodulator output data. As explained above, the time-alignment is necessary since otherwise there would be a wrong despreading, since not only the correct despreading sequence (generated by the code generator PN-GEN), but also the correct timing is necessary such that the demodulator output data can be correctly despread.

As is shown in FIG. 7, the output data from the despreader DESP is input to a coherent accumulation/averaging means ACC-AV which calculates the delay profile DPS controlled by the control means CNTRL. The delay profile is essentially generated on the basis of the demodulator output data (the extracted pilot symbols plus the additional samples) in response to the frame clock control signal FCC. An embodiment of the despreader DESP and the coherent accumulation/averaging means ACC-AV according to the invention is shown in FIG. 9.

The despreader DESP comprises a correlation means CM formed by a multiplication means MM and an integration means IM. Since the demodulator output data comprise real and imaginary parts and the despreading sequence generated by the coded generator PN-GEN must also comprise real and imaginary parts, the correlator CM is a complex correlator and the multiplication means MM performs a complex multiplication. The starting point of the PN-sequence is controlled by the phase control means PH-CNTRL.

The multiplication means MM comprises multiplexers M1, M2, M3, M4 and adders ADD1, ADD2. The integration means IM comprises summation units SUM1, SUM2.

The multiplier M1 multiplies the real part Rx_Re of the demultiplexer output data with the real part PN_Re of the spreading sequence and applies the multiplied data value to the adder ADD1. The multiplier M2 multiplies the imaginary part Rx_IM of the demultiplexer output data with the real part PN_Re of the PN sequence. The multiplied signal from the multiplier M2 is input to the adder ADD2. The multiplier M3 multiplies the imaginary part Rx_Im of the demultiplexer output data with the imaginary part PN_Im of the PN sequence and applies the multiplied data to the adder ADD1. The multiplier M4 multiplies the real part Rx_Re of the demultiplexer output data with the imaginary part PN_Im of the PN-sequence and applies the output signal to the adder ADD2. The adder ADD1 adds the output signal from the multiplier M1 and the output signal from the adder M3 and applies an added signal to the summation unit SUM1 of the integration means IM. The adder ADD2 adds the output signal from the multiplier M2 and an inverted output signal from the multiplier M4 and supplies the added signal to the summation unit SUM2 of the integration means IM.

The multiplication means MM outputs results from the adders ADD1, ADD2 for each pilot chip and the summation units SUM1, SUM2 perform an addition of the output signals from the adders ADD1, ADD2 for N_pilot_chips (e.g. 2×128 times). Since the completed data is a digital signal, the summation performed in the summation units SUM1, SUM2 correspond to an integration of the output signals from the multiplication means MM.

As one preferred embodiment the PN-generator PN-GEN generates the complex quadrature short Walsh Hadamard and the real long Gold (Walsh Hadamard) as the despreading codes with which the demodulator output data is multiplied.

If the complex correlator means CM is driven at an oversampling rate OS, only every OS-th complex multiplication delivers a non-zero result. Care has to be taken if an OQPSK-modulation scheme is applied. Preferably, in this case, the complex multiplication performed in the multiplication means MM can be split into two real multiplications at a distance of OS/2. The overall code phase is adjusted in increments of 1/OS of a chip period. A serial search through the time uncertainty region (delay spread) with constant dwell time of one pilot symbol period (here: 31.25 $\mu s$) at each code phase position (1/OS of a chip period) can preferably be applied. Thus, a certain number of code phases can be evaluated per slot and searcher. Since these operations are done off-line, processing at a higher speed can be applied.

The number of evaluable code phases equals the ratio of the total number of chips per slot and the numbers of chips per pilot symbols times this overprocessing factor OP (here: OP*2560/256=OP*10). One example is a hardware implementation of eight searchers at an overprocessing factor OP=4. Another example is two searchers at OP=16.

In the coherent accumulation/averaging means ACC-AV a coherent summation unit SUM3 performs a coherent accumulation on the despread values of two consecutive periods of pilot symbols (i.e. four pilot symbols in total corresponding to two slots). In total, 160 samples of a delay profile can be calculated per searcher during 2/OP frames (=2*16/OP slots), i.e. within the repetition time of 20/OP ms. This applies to a searcher with one correlator and one despreader. By grouping a number of correlators and despreaders within the set of searchers (FIG. 6) a parallel searcher architecture can be defined. However, this does not present a limitation of this general description of the invention.

The complex output of the coherent accumulation/averaging means ACC-AV, i.e. the real part Re_Imp [Phase] and Im_Imp [Phase] are then input to the squaring unit SQ. In the unit SQ the real part and the imaginary part of SUM3 is respectively squared and added ($|(a+jb)|^2=a^2+b^2$). The output of the unit SQ, namely the partial real delay profile value $DPS_i$ is input to the summation unit SUM4 which performs a non-coherent accumulation of the samples. The output from the summation unit SUM4 is the actual real delay profile DPS. Thus, the summation unit SUM4 essentially averages two delay profiles $DPS_i$ from two or more succeeding slots. Thus, the underlying principle of the delay profile determination is to perform a complex valued channel estimation in each time slot, then to non-coherently add the complex channel estimates (complex samples) of at least 2 time slots and to finally non-coherently add delay profiles (real values) of (added) channel estimates from respectively 2 time slots.

Therefore, the primary function of the despreader DESP can be described as multiplying a time-aligned PN-sequence with the demodulator output data, whilst the coherent/non-coherent accumulation/averaging means ACC-AV performs an averaging over two or more successive slots. The output is an averaged delay profile DPS which is based on the demodulator output data, namely the pilot symbols (+ added samples) over one used period for the coherent averaging (FIG. 11). Thus, the calculated delay profile DPS is much more accurate, since it uses pilot symbols from succeeding slots (or frames).

The following example illustrates the functioning of the despreaders DESP and the coherent accumulation/averaging means ACC-AV. Assuming an antenna diversity in each sector, three (active) sectors within a cell with correspondingly six antenna signals can be processed by using 6 searchers during two frames for OP=1. If, as another example, just one sector is selected (active), 3 out of the 6 searchers can be assigned to each antenna signal. Correspondingly, the number of correlations per sample of the delay profile can be increased by a factor of 3. Thus, during 2 frames (see FIG. 11) 3 consecutive delay profiles can be computed for OP=1 from which an estimate with reduced peak and interference variances can be obtained by averaging. This leads to an improved delay profile DPS.

With OP=16 and 2 searchers, it is possible to calculate 2*8 (consecutive) delay spectra within the frame period of 10 ms and 16 time slots. The sector control mechanism (the sector scheduling is explained below) can distribute, i.e. allocate this number to active and non-active sectors. For example, for two active sectors (two antenna signals each) three consecutive delay profiles and for two non-active sectors (two antenna signals each) one delay profile can be calculated (see FIG. 13). Thus, non-coherent averaging for the active sectors can be applied during each frame. Within 60 ms, three delay spectra also for the non-active sectors can be calculated, thus allowing non-coherent averaging also for the non-active sectors.

In order to increase the number of non-coherent accumulations (averaging) in the coherent accumulation/averaging means by a factor of 2 without increasing the update time, an "interleaved" averaging scheme according to the invention (see FIG. 11) for an update time of 10 ms may be employed. Here the last two consecutive (perhaps already non-coherently averaged) delay profiles, the currently calculated profile and the profile of the update time before, are (further) averaged in order to calculate improved delay profiles at an unchanged update rate of 10 ms. One preferred interleaving scheme for calculating the delay profiles DPS is for example as follows. In frame n−1 a delay profile $DPS_{n-1}$ is calculated. Then in the present frame n a further delay profile $DPS_n$ is calculated. In frame n the two delay profiles are accumulated (added) non-coherently and the added delay profile is used as the delay profile $DPS_n$ for frame n, i.e. $DPS_n'=DPS_{n-1}+DPS_n$. The actually calculated delay profile $DPS_n$ in frame n is stored to be used for a further accumulation in the next frame n+1. It is also possible to apply a weighting factor to the previously calculated delay profile $DPS_{n-1}$. Instead of just accumulating (non-coherent adding) of two delay profiles $DPS_{n-1}$, $DPS_n$, it is also possible to store a plurality of preceding delay profiles DPS and then to non-coherently add a plurality of frames to result in the delay profile DPS for the frame n. The plurality of delay profiles can also be weighted before the accumulation. Thus, also different embodiments are possible that take into account a kind of FIR or IIR filtering (or weighting) of the respective delay profiles DPS.

According to another embodiment of the coherent accumulation/averaging means, the delay profiles of two corresponding sector antennas can be added (within the path selection unit PSU) (see FIG. 6 and FIG. 10) exploiting the antenna diversity. In this case, the coherent accumulation/averaging means ACC-AV can preferably add two delay profiles from the two different antennas.

On the basis of the final delay profiles DPS output by the summation unit SUM4, interference (noise) estimates are calculated in the path selection unit PSU. The despreader DESP and the coherent accumulation/averaging means ACC-AV are controlled by digital signal processors DSPs, which stear the correlation as well as the coherent and non-coherent accumulation processes.

In any case, it is seen that the despreader DSP performs the despreading on the basis of the pilot symbols and the coherent accumulation/averaging means ACC-AV performs an averaging of delay profiles calculated on the basis of the pilot symbols within each frame. The calculation of partial delay profiles $DPS_i$ on the basis of pilot symbols is superior to the usage of random data to determine the delay profiles. The other aspect of the invention is that consecutive delay profiles, at least over two consecutive frames, are averaged, thus leading to a more accurate delay profile DPS.

Embodiment of the Path Selection Unit

As explained before, the individual searchers S1 . . . SL each output a delay profile DPS which is calculated on the basis of the periodic pilot symbols and which is preferably an averaged delay profile calculated from two succeeding frames.

Figure 10:
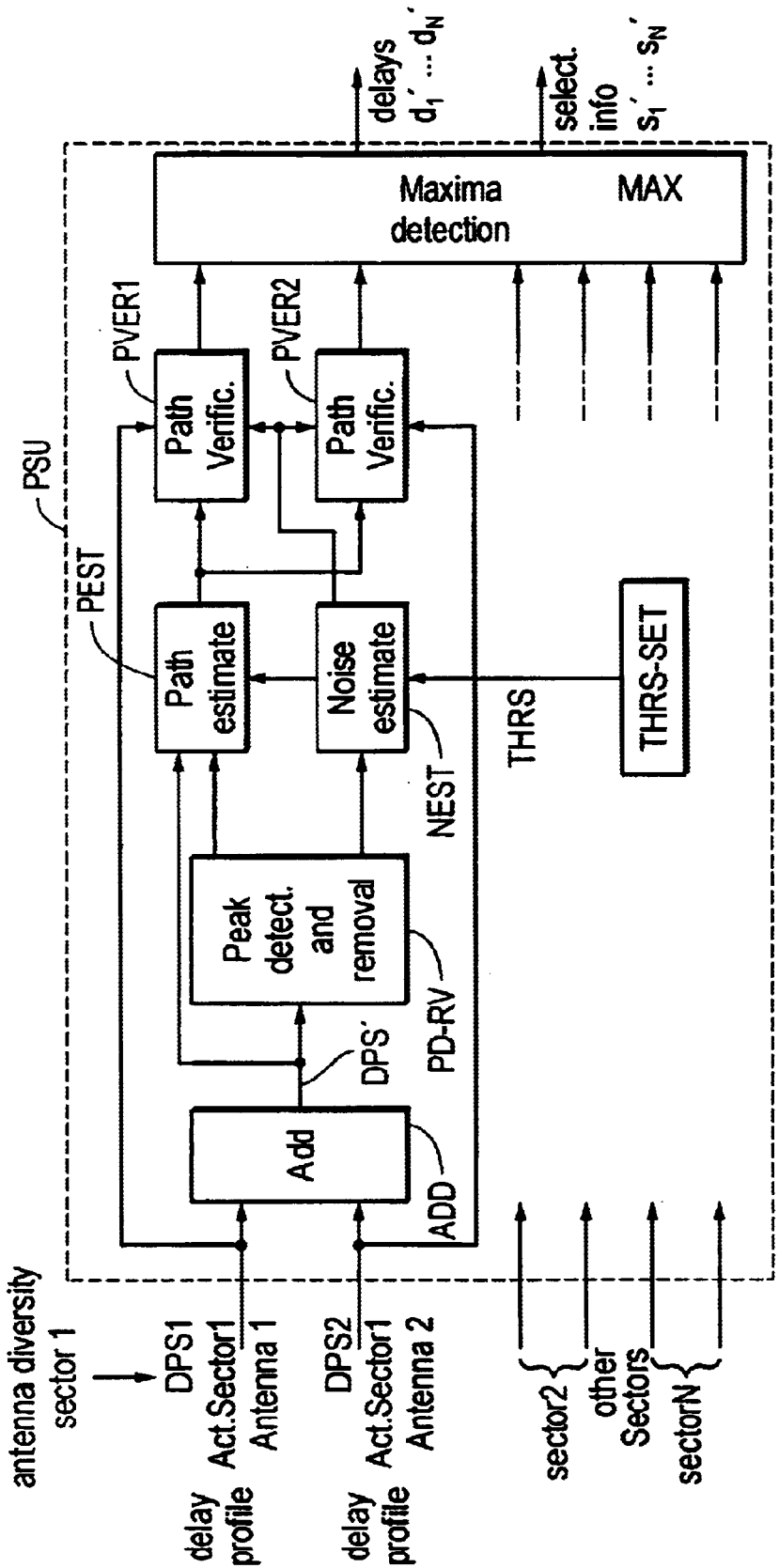
FIG. 10 shows an embodiment of the path selection unit PSU for the example of selecting the paths from two antennas in sector 1, according to the invention.
Figure 14:
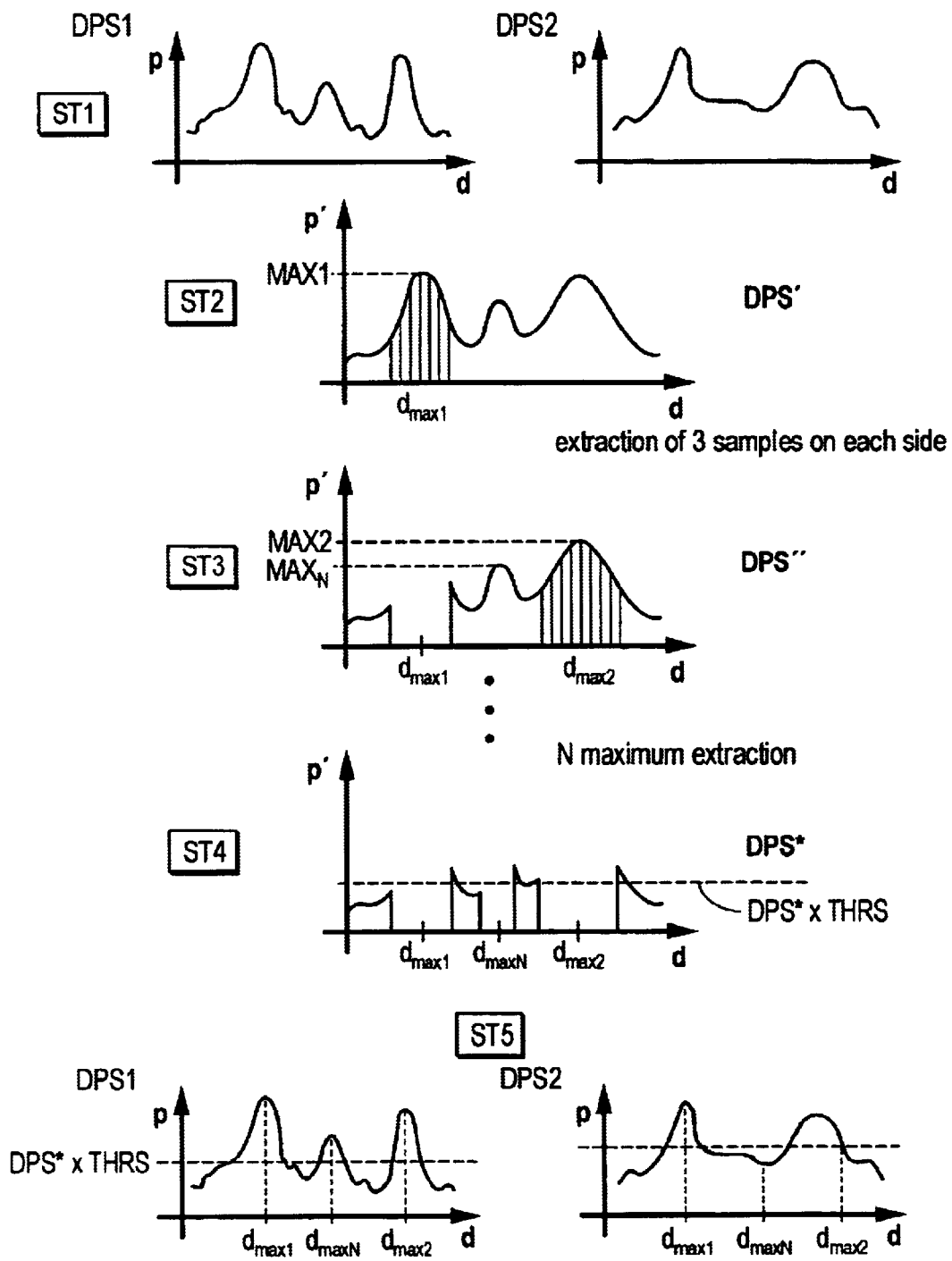
FIG. 14 shows an embodiment of the path selection method according to the invention.

Now it will be described how the path selection unit PSU selects the predominant paths contained in the delay profile DPS. An embodiment of the path selection unit PSU is shown in FIG. 10. The function of the PSU will be described for the inputting of two delay profiles DPS from two antennas Ant1, Ant2 belonging to the same sector (in FIG. 10 it is the sector 1). It should, however, be understood that each of the searchers 1 . . . L separately comprise the equivalent means to respectively output the most dominant (strongest) paths in the respective sector. For illustration purposes of the invention it is at this point assumed that an antenna diversity is used within each sector. However, the invention is not restricted to the antenna diversity. FIG. 14 shows the processing of the delay profiles in the path selection unit PSU.

The path selection unit PSU comprises an adder ADD, a peak detection and removal means PD-RV, a path estimation means PEST, a noise estimation means NEST, path verification means PVER1, PVER2 and a maximum detection means MAX and a threshold setting means THRS-SET. The noise estimation means NEST receives a threshold factor or threshold value THRS from the threshold setting means THRS-SET. The primary function of this path selection unit PSU, as already explained with reference to FIG. 6, is to extract the N-strongest paths $d_1' \ldots d_N'$ (i.e. delay values) out of the respective delay profiles DPS1, DPS2 by taking interference (noise) estimates into account. In addition, a selection information $s_1' \ldots s_N'$ is generated, indicating the (active) sector (and antenna signals) that have been selected. The delay and selection information which has been calculated on the basis of the input delay profiles, is passed to the tracking and control means TRCU that performs the final selection as indicated in FIG. 6.

The path selection unit PSU outputs new strongest paths and new selection information $s_1' \ldots S_N'$ at the update time (e.g. 10 ms), i.e. at the minimum every frame period.

Hereinafter, the function of the individual means of the path selection unit PSU is described with reference to FIG. 10 and FIG. 14.

If default two antenna signals per sector (antenna diversity) or their respective delay profiles DPS1, DPS2 are to be processed, the respective delay profiles DPS1, DPS2 are first added in the adder ADD. It should be noted, that the procedure described hereinafter also applies to the case where the antenna diversity is not used. In this case the adder ADD is omitted and the calculated delay profile DPS from one antenna per sector is input directly to the path detection and removal means PD-RV and the path estimation means PEST. Therefore, the antenna diversity with two antennas is only a preferred embodiment of the invention.

From the added delay profile DPS' (see step ST1 in FIG. 14) the overall maximum MAX1 is searched (step ST2). The maximum MAX1 and a certain number of samples (preferably three depending on pulse spread) on each side of the maximum (pulse spread) are removed or respectively set to zero in the peak detection and removal means PD-RV. As explained before, in total there are a number of 160 samples for each delay profile DPS, such that only the removal of the maximum MAX and three samples to the left and right does not destroy the complete characteristic of the delay profile, i.e. essentially the maximum MAX1 should be removed. The maximum MAX1 and the corresponding delay value $d_{MAX1}$ are stored in the peak detection and removal means PD-RV.

The procedure of maximum removal from the DPS' is repeated N-times (step ST4), thus giving a set of N-candidate delay values $d_{max1}, d_{max2} \ldots d_{maxn}$ and corresponding peak values MAX1, MAX2 . . . MAXN. The remaining averaged delay profile $\overline{DPS^*}$ is considered as interference (noise) from which the mean value DPS is calculated in the noise estimation means NEST (step ST4). That is, since the relevant maxima have been removed from the added delay profile DPS*, the rest of the delay profile DPS* can be considered as but interference or noise. Preferably the number of maxima should smaller than the number RAKE fingers.

Then the stored candidate peak values MAX1, MAX2 ... MAXN are compared to the effective noise level $\overline{DPS^*}$ multiplied by a certain adaptable but constant threshold factor THRS. THRS is gained from an optimization procedure and might reflect the number of scanned sectors, the signal-to-interference ratio and the number of non-coherent accumulations. Thus, the path estimation means PEST only considers those values above the effective noise floor as real delay values which correspond to respective independent direct and indirect propagation paths not necessarily the direct one.

If no antenna diversity is used i.e. if only the profile DPS of one antenna (and not the added profile) is evaluated then the path estimation comes to an end, i.e. the selected maxima that lie above the multiplied threshold are input (for each sector) to the maximum detection means MAX, which outputs the delays and the selection information for the N highest maxima of all sectors.

Preferably, if antenna diversity is used, the original calculated delay profiles DPS1, DPS2 undergo a further processing in the respective path verification means PVER1, PVER2. As seen in step ST5 in PVER1, PVER2 the two delay profiles DPS1, DPS2 are independently from each other (again) checked against the threshold, i.e. $\overline{DPS^*} \times THRS$. Only those maxima in each DPS are kept for each antenna as prospective peaks that still exceed the threshold (of course the threshold has to be adapted by a division of 2 if DPS1+DPS2 was not normalized by ½). Thus, now the final selected paths—per antenna and sector indicated by the selection information—are determined.

At this point, the output of the maximum detection means MAX is—by having evaluated all sectors (for example six sectors) with respect to their input N maxima—a measure of the most relevant delays $d_1' \ldots d_N'$ as well as the selection information from which sector these strongest maxima and their delays originated. Thus, the output of the maximum detection means MAX, i.e. in fact the output of the path selection unit PSU, is a measure of the propagation paths that carry the most energy (i.e. the most important delays plus an indication where (i.e. in which sector) these path delays have occured. The maximum detection means orders the maxima in a descending order from the highest to the lowest maxima (with a corresponding adaptation of the selection informations).

Figure 12:
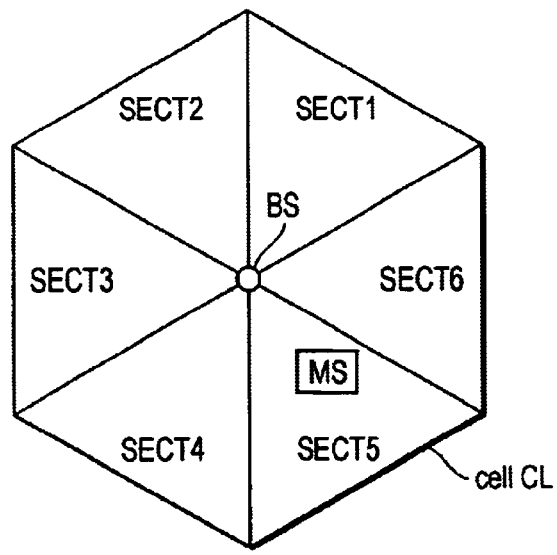
FIG. 12 shows the subdivision of a cell into individual sectors, each serviced by two antennas Ant1, Ant2.

By adapting the sector selection method (the sector selection scheduling) and by adjusting the correlation process as will be described below, a trade-off between the number of active and non-active sectors, the update time and accuracy of the calculated delay profiles can be made. That is, by performing an appropriate search through the individual sectors (see FIG. 12) and by distinguishing between active and non-active sectors, an even more accurate delay profile and a determination of the movement of the mobile station between sectors can be calculated. Apart from the calculation of an improved delay profile, the sector selection procedure can also be used for a softer hand-over, i.e. generally for a more accurate determination of where the mobile is located and/or whether the mobile is located on the boarder line between two sectors.

Hereinafter, the function of the tracking and control unit TRCU shown in FIG. 6, which receives the above described output from the path selection unit PSU, will be described.

Embodiment of the Tracking and Control Unit

As is seen in FIG. 6, the tracking and control unit TRCU receives the output from the path selection unit PSU (see FIG. 10), i.e. the delay times $d_1' \ldots d_N'$ of the most relevant maximum values obtained from all path verification means PVER1, PVER2 of all sectors as well as the specific selection information $s_1' \ldots s_N'$ indicating to which sector and which antenna the respective delay time belongs. The unit TRCU now selects the P strongest maxima from the output of the unit PSU (P=number of RAKE fingers), i.e. the delay values $d_1 \ldots d_P$ and the respective selection information $S_1 \ldots S_P$.

However, of course the values output by the path selection unit PSU as such are only valid as long as a fixed position (and distance) between the mobile station MS and the base station BS is maintained. If the position is varied, which is the normal case, then of course the power delay spectrum DPS, i.e. the delay times, might change. Now, of course each search means S1 ... SL may use a predetermined window for determining the power delay spectrum. That is, the phase of the code generator PN-GEN (with its oversampled despreading sequence) or the signal sequence itself by inverting or removing samples by the pilot demultiplier is shifted a predetermined number of spreading symbols and this shifting corresponds to evaluating a predetermined delay time. Of course, during a first transmission set up between the mobile station MS and the base station BS, a predetermined average delay time will apply even to the direct path P1. During this time a predetermined window of shift distances (delay spread) can be determined. However, the center value of the delay spread window must be shifted corresponding to a distance change between the mobile station MS and the base station BS if the mobile station MS moves around. Different strategies are thinkable.

Therefore, the first function of the tracking and control unit TRCU is to adapt (track) the (delay spread) search windows to distance variations between MS and BS. It will not do so continuously, but preferably a minimum update time of 10 ms (length of a radio frame) will be sufficient (OP=16, 2 searchers, 2 active sectors, 3 non-coherent averagings without interleaving). The buffers included in the pilot demultiplexers of the selector SEL are controlled by insertion or removal of samples (of the pilot symbols and data symbols) by adjusting the read and write pointers within the pilot demultiplexer. By shifting the read and write pointers in the demultiplexer, different start and end timings of the extraction of the pilot symbols plus the additional samples are achieved which corresponds to a shifting of the values resulting effectively in a change of the search window. Another possibility is to shift the PN-generator phase as explained above.

During a sector (softer) hand-over a common search window off-set is applied to both adjacent sectors in order to maintain synchronization. This common search window off-set is therefore also usable for (adjacent) non-active sectors (where no substantial power delay spectrum, i.e. no detectable paths, can be calculated/expected). Algorithms for adapting the search window to mobile movements or distance variations (resulting in varying delays) can easily be deviced by those skilled in the art, by considering for example the movement (delay) of the highest maximum MAX1 over time.

Apart from the shifting of the search window employed in the searcher, the tracking and control unit TRCU has another function, to also update the already calculated delay path $d_1' \ldots d_N'$ according to the adjustments of the search window and to select a certain number of final delay values $d_1 \ldots d_P$ and corresponding antenna/sector information $d_1 \ldots d_P$. (P=number of the RAKE fingers).

Thus, each PVERn unit is delivering a set of "candidate" peaks. All peaks are arranged in a descending order by the maximum detection unit MAX and only the P largest are maintained (irrespective what sector they are from) by the unit TRCU.

This procedure is carried out for all antennas of all active sectors and out of all "survivors" amongst all investigated antenna signals of all active sectors a sequence of pre-defined maximum length (i.e. adapted to the number of RAKE fingers, e.g. p=8) in descending order with respect to the power of the maximum values is arranged. This sequence now reflects the strongest paths found within all currently investigated antenna signals (this will normally reflect the active sectors but might also include—currently still-non-active sectors). Simultaneously with the selection of the new delay values $d_1 \ldots d_p$ according to the new descending order, of course the selection information will also be updated to indicate the location of the respective delay times, i.e. to indicate the respective sectors belonging to the respective delay times. This selection information will tell the RAKE receiver connected to the output of the searching and tracking unit STU which signals have to be demodulated. If less than this maximum number of path are identified, the RAKE receiver gets information that some RAKE fingers have to be switched off (e.g. by setting the respective selection information s to a negative value)

It is to be noted that the above-described updating of the delay times and the selection information output by the path selection unit PSU is not restricted to the case of antenna diversity. If only a single antenna per sector is used then only one delay profile need to be examined.

As was already explained above, the number of sectors and the number of searchers are not necessarily the same. Preferably, the set of searchers consists of six searchers in total. However, the number of sectors may be larger or smaller or equal to the number of searchers. Therefore, the control means CNTRL in FIG. 6 controls the selector SEL such that the individual antenna signals (one or two per sector) are applied to the respective searchers in a time-shared manner.

Sector Selection Scheduling

As was also explained above, in the present invention the searcher preferably calculates a delay profile on the basis of pilot symbols extracted from at least two consecutive time slots within each frame. As indicated in FIG. 11, each frame, however, consists of 16 time slots. Assuming a case where the (single) antenna signal is applied by the selector SEL to one individual searcher over the complete frame period of 10 ms, then obviously the searcher could not only perform a calculation of the final delay profile by only once evaluating two consecutive time slots, but in fact the searcher could—for this antenna signal—carry out the calculation in total eight times for this antenna signal (16 time slots). However, the control means CNTRL can switch at two other time slots to another antenna signal after having performed the time slot computation for the present antenna signal (since in fact after the first computation using two time slots there is time amounting to 14 other time slots). Hereinafter, it is explained how the sector scheduling, i.e. the application of antenna signals to a set of searchers each performing the computation of data in two consecutive time slots—can preferably be performed. It is however noted that the unit TRCU can also use a (non-optimal) sector scanning rule which is preset for a predetermined number of sectors for each cell.

Firstly, the tracking and control unit TRCU determines which of the sectors are active sectors and which of the sectors are non-active sectors. The selection information $s_1 \ldots s_p$ in connection with the delay times $d_1 \ldots d_p$ indicate which of the presently available sectors are active or non-active. That is, sectors, which are active, are indicated in the selection information.

Secondly, the tracking and control unit TRCU (or the control means CNTRL, respectively) decides how many coherent accumulations can be performed in one frame. As explained above, if the complete frame for example contains 16 time slots, this will indicate that in total 8 independent coherent accumulations can be performed in a frame (based on 2-slot coherent channel estimations. That is, the number of coherent accumulations which can in principle be carried out in one frame is the number of time slots divided by 2.

Next, the tracking and control unit TRCU determines the number of non-coherent accumulations, that is, the number of separate $DPS_i$ calculations (respectively done by considering two consecutive time slots) which are then added up non-coherently (i.e. their absolute values are added).

Next the tracking and control unit TRCU determines the update time for the power delay spectrum updating (i.e. the window shifting). The updating time essentially means the period after which the same two time slots in the same sector for calculating the same DPS profile need to be looked at. The update time for active sectors need not necessarily be the same as in non-active sectors. That is, since the major changes (distance changes) will occur in the active sectors, the non-active sectors need not be looked at so often, i.e. their update time may be larger. However, to have the same accuracy for the delay profile calculation, preferably the number of non-coherent accumulations should be the same in the active sectors and the non-active sectors.

Finally, the tracking and control unit TRCU and the control means CNTRL—in order to determine the scheduling—must know how many searchers S1 ... SL are available. That is, if there are more searchers that work parallely, of course more sectors can be scanned within each frame.

Thus, the tracking and control unit TRCU determines at anyone time the scanning scheduling of the sectors on the basis of the number of active and non-active sectors (as indicated by the selection information), the number of time slots per frame (determining the number of possible coherent accumulations), the number of non-coherent accumulations desired for the active sectors and the non-active sectors, the desired up-date times for the active and non-active sectors as well as on the basis of the number of sectors (fixed) and the number of searchers (also fixed).

Of course, once the scanning schedule has been determined the scanning of sectors using this particular scanning schedule only makes sense as long as the sector status (indicated by the selection information) stays the same. That is, if one non-active sector suddenly becomes an active-sector (due to a movement of the mobile station) then a different scanning schedule is set by the tracking and control unit. With such a scheduling scheme, of course the movement of the mobile station from one sector to another sector accross a sector boundary can be decided in a "soft" manner. That is, if the mobile station moves from one active sector in a direction towards a non-active sector then at some stage the receiving antenna in the non-active sector will start to receive a signal and if the mobile station is close to the boundary the previously non-active sector will exhibit a delay profile including maxima which will indicate that the sector becomes active. However, the decision process is not a hard decision process, since essentially with the sector scanning a continuous movement of the mobile station can be monitored.

It is also possible that two sectors are declared as active ones, the other 4 as non-active. The assignment of the sectors as active or non-active may change, but the number of active-non-active (similar: 3 active–3 non-active etc.).

Figure 15:
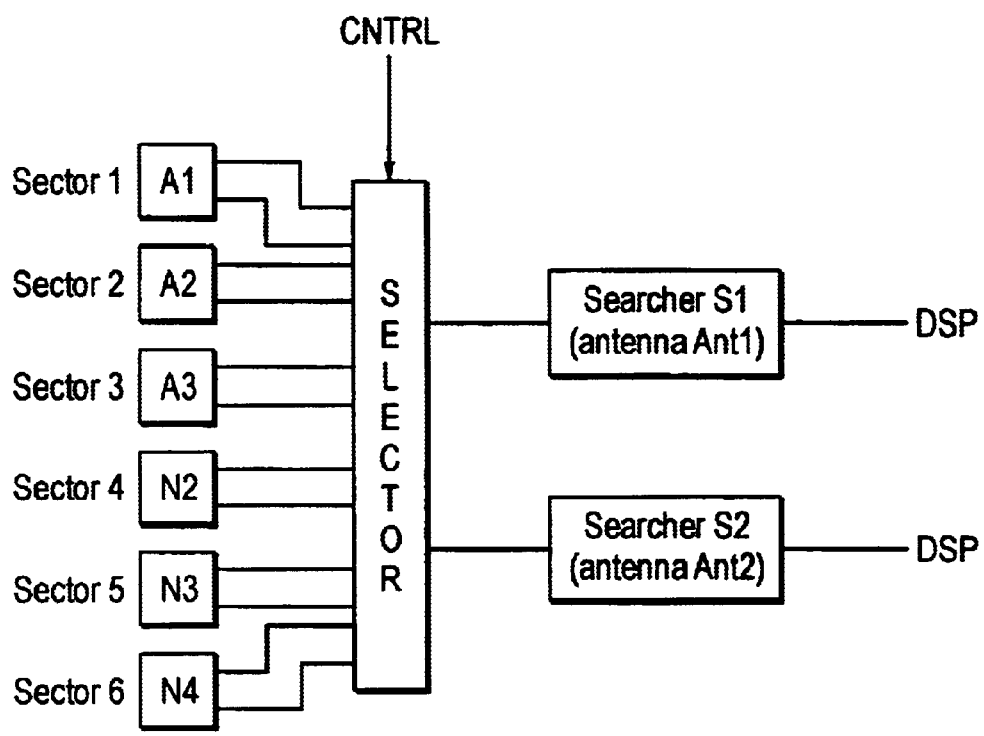
FIG. 15 shows an embodiment of the searching and tracking unit including 2 searchers S1, S2 for searching 6 sectors including an antenna diversity.

The following Table 1 in connection with FIG. 13, FIG. 15 shows an example of such a sector scheduling. In this example it has been assumed that the entire frame is 10 ms long and contains 16 time slots resulting in the potential possibility of handling 8 coherent accumulations.

For the case of 1 active/5 non-active sectors, update times for the non-active sectors were allowed to be 50 ms, 10 ms, 20 ms, 30 ms, respectively. For the active sectors an update time of 10 ms, i.e. every frame, is required.

In the case of 2 active/4 non-active sectors, the non-active sectors are allowed to have an update time of 10 ms, 20 ms, 60 ms, respectively.

In the case of 3 active sectors 3 non-active sectors an update time of 30 ms is requested for the non-active sectors. The number before the update times in brackets indicate the possible number of coherent accumulations.

In fact, in Table 1 it has been prespecified that two searchers with an oversampling rate of OP=16 and a requested update time of 10 ms for each active sector are used. Also, a minimum number of two non-coherent accumulations is requested. The circuit configuration for this is shown in FIG. 15. A control signal CNTRL will indicate to the selector the timing when the respective first and second antenna of each sector is applied to the first and second searcher S1, S2. In FIG. 15 it is assumed that the first antenna is always handled by the first searcher S1 and the second antenna is always handled by the second searcher S2.

In Table 1 the cases where the number of non-coherent accumulations is the same and their respective update times are indicated in a bold-face frame. For example, for the case of 2 active sectors/4 non active-sectors the non-active sectors only need to be updated after 6 frames (60 ms), wherein the active sectors are updated after every frame (10 ms). However, the same number of non-coherent accumulations (3) are employed. Obviously putting different constraints on the update times, for example increasing the update times for the non-active sectors will allow more non-coherent accumulations.

TABLE 1

| 1 active | 5 non-act. | 2 active | 4 non-act. | 3 act. | 3 non-act. |
|---|---|---|---|---|---|
| 7 (10 ms) | 1 (50 ms) | 2 (10 ms) | 1 (10 ms) | 2 (10 ms) | 2 (30 ms) |
| 6 (10 ms) | 2 (50 ms) | 2 (10 ms) | 2 (20 ms) | | |
| 5 (10 ms) | 3 (50 ms) | 3 (10 ms) | 1 (20 ms) | | |
| 4 (10 ms) | 4 (50 ms) | 3 (10 ms) | 2 (40 ms) | | |
| 3 (10 ms) | 1 (10 ms) | 3 (10 ms) | 3 (60 ms) | | |
| 3 (10 ms) | 2 (20 ms) | | | | |
| 3 (10 ms) | 3 (30 ms) | | | | |

The aforementioned example of 2 active sectors/4 non-active sectors with update times of 10 ms, 60 ms and three non-coherent accumulations (using an antenna diversity in each sector and 2 searchers) give the most relevant information as to how the sectors must be scanned. Whilst the update times determine how often a sector must be looked at, it, however, does not exactly specify the sequence of scannings. FIG. 13a), b) show two different scanning sequences. In FIG. 13 "A" denotes an active sector, the number following "A" denotes the first, second and third active sector and the subscript following this number denotes the number of the DPS calculation (i.e. the coherent accumulation performed over 2 time slots). "N" denotes a non-active sector.

In FIG. 13a) the three coherent accumulations 1, 2, 3 for the active sector 1, $A1_1$, $A1_2$, $A1_3$ and the three DPS calculations for the second active sector, $A2_1$, $A2_2$, $A2_3$, are successively performed. There are four time slots left in frame 1 which are respectively used for performing the first DPS-calculation in the non-active sectors $N1_1$, $N2_1$. The update time of 10 ms for the active sectors can be seen in frame 2, since after every 10 ms the same sequence of DPS calculations is used for the active sectors. However, the remaining four time slots can respectively be used for a scanning of the non-active sectors N1, N2 for their respective second DPS calculation, $N1_2$, $N2_2$. The scanning of the active sectors is maintained in every frame wherein in every frame the last four time slots are used for the scanning of the non-active selectors. Since the update period for the non-active sectors has been selected to 60 ms, the sequence of scannings in frame 1 regarding the non-active sectors is only repeated in the 7th frame (not shown) which is in fact the same as frame 1.

FIG. 13b) shows another realization of the scheduling as prescribed by the parameters in Table 1. Here, the sequence of scannings of active-sectors and non-active sectors has been changed, whilst still the constraints as given in Table 1 are fulfilled. Therefore, there is some freedom in still arranging the scannings within each sector.

Depending on how the scanning of the non-active sectors with respect to their first, second and third coherent DPS calculation is performed, after every third DPS calculation a non-coherent accumulation can take place and the delay profiles can respectively be evaluated for changes. When the mobile station moves around, the delay profiles will change their shape (due to different multipath propagation), however, overall the path selection unit will still indicate that the sector is active, even though the delay profile has changed. Evaluating the delay profile in one active sector with respect to the delay profile in one or more adjacent active sectors can give an estimation as to the direction in which the mobile station moves. Even if the delay profile in the non-active sectors, as long as they stay non-active, do not contain any maxima (paths) that would exceed the defined threshold level, the delay profiles of the non-active sectors can nonetheless be evaluated together with the active-sectors, since even the delay profile in a non-active sector will change if the mobile station moves from a non-active sector in the direction of an active-sector.

Thus, by evaluating the delay profiles as soon as all non-coherent accumulations have been performed in all sectors (in the example in FIG. 13 after 60 ms) all delay profiles can be evaluated together which gives an estimate of the location of the mobile station within the cell and of the moving direction of the mobile station.

Performance of the Inventive CDMA Base Station

Hereinafter, a CDMA base station including 6 searchers with OP=1 is investigated.

The performance of the searching and tracking algorithm is characterised by the detectability of channel paths from the delay profile. Channel paths become visible in the estimated delay profile as autocorrelation peaks. The estimation algorithm must be capable to reveal these autocorrelation peaks at a reasonable signal-to-interference ratio above interference level. The path detectability depends on the signal-to-interference ratio in the RF band and the despreading gain of the searching algorithm as well as the peak and noise variances. The despreading gain of the searching algorithm is defined by the despreading gain per pilot symbol and the number of coherent accumulations of despread pilot symbols.

For the proposed algorithm this despreading gain equals, e.g., 10*log 128*4=27 dB. The signal-to-interference ratio $E_{ch}/I_0$ seen by the channel estimation (i.e. the distance between autocorrelation peak and noise floor in the estimated delay profile) is by, e.g., 10*log 512/M (in dB) higher than the $E_s I_0$ per modulation symbol, where M ∈ {16,32,64, 128)} is the modulation symbol spreading factor. Since a rate 1/3 convolutional code and a quarternary modulation scheme is applied, the $E_{ch}/I_0$ is by 10*log 2*512/3M (in dB) larger than the corresponding $E_b/I_0$. The peak and noise variances decrease with an increasing number of non-coherent averagings, i.e. the detection probability increases and the false alarm probability of detecting a non-existing peak decreases.

Figure 16:
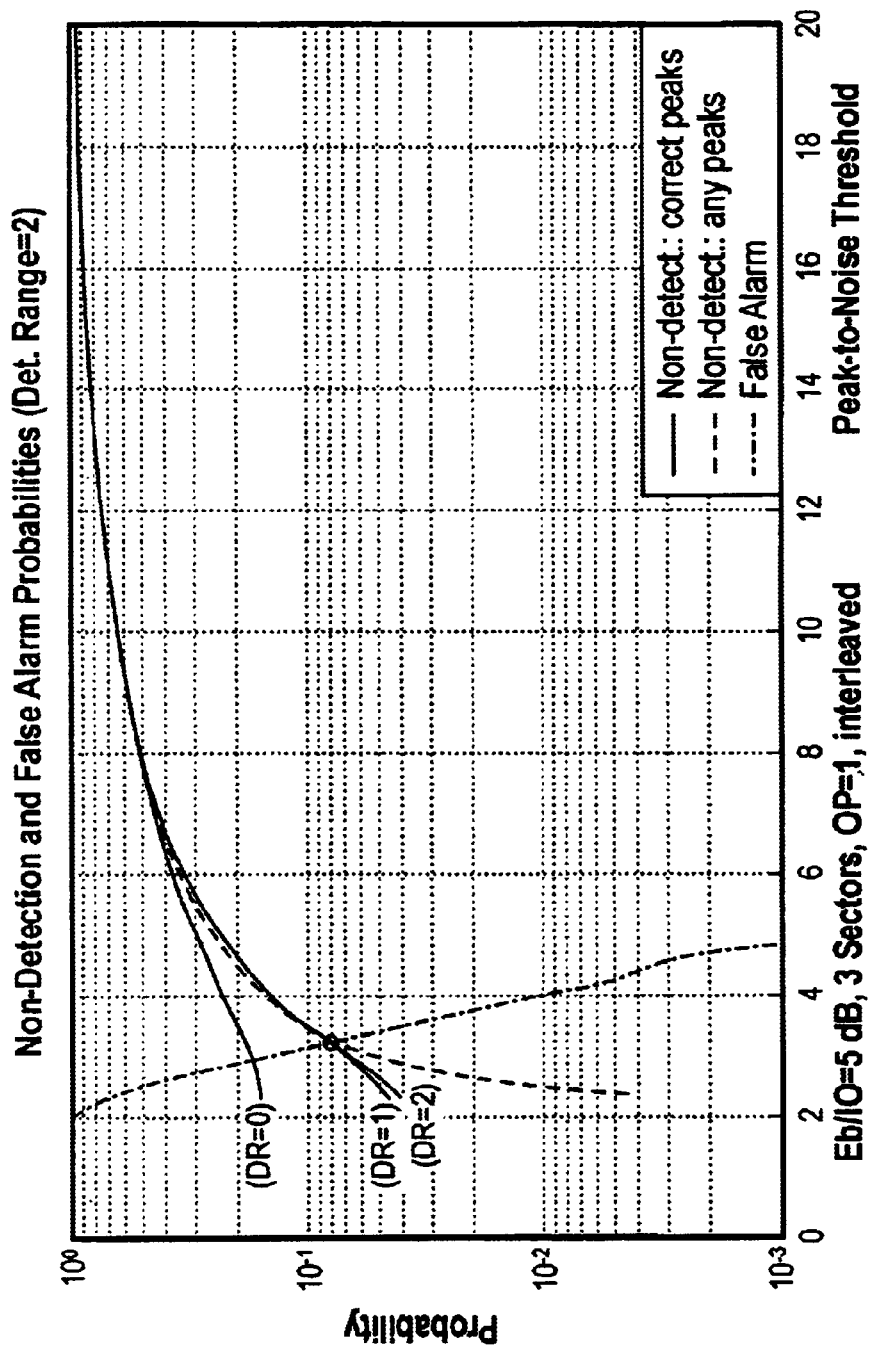
FIG. 16 shows non-detection and false alarm probabilities for the case of 3 sectors.
Figure 17:
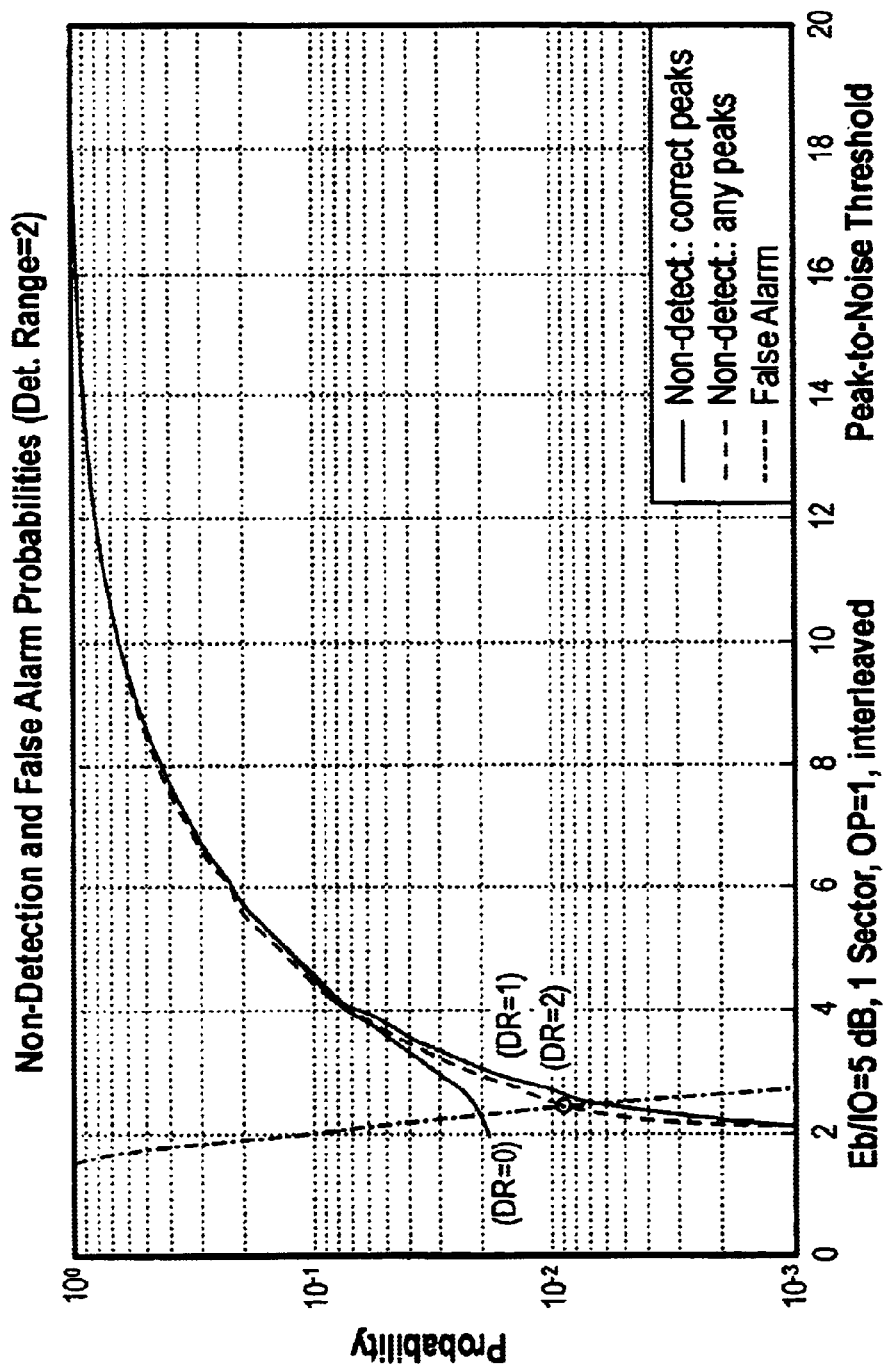
FIG. 17 shows non-detection and false alarm probabilities for the case of 1 sector.

FIGS. 16, 17 show examples of the probabilities of non-detecting an existing peak and, in contrary, of detecting a non-existing peak ("false alarm") for a 2-path, equal strength, independently Rayleigh fading channel, v=50 km/h, M=64 and Eb/I$_0$=5 dB. The underlying update time was 20 ms (6 searchers, OP=1). Antenna diversity and the interleaved averaging scheme was applied. The curves are plotted versus the peak-to-interference threshold, i.e. the (normalised) ratio of peak and corresponding noise values. Different curves for the non-detection probability are shown: Detection ranges (DR) of 0, 1 and 2 samples were investigated. This means that all peaks are counted as correctly detected if they exceed the peak-to-noise level and if their corresponding delay value lies within the interval [correct_ delay-DR correct_delay+DR]. 'any peaks' means that all peaks above peak-to-noise level without checking their actual delays were counted. As can be seen the strict evaluation with DR=0 leads to some performance loss. However, for DR=1 and, especially, DR=2 no significant loss with respect to the non-detection probability can be identified.

Figure 18:
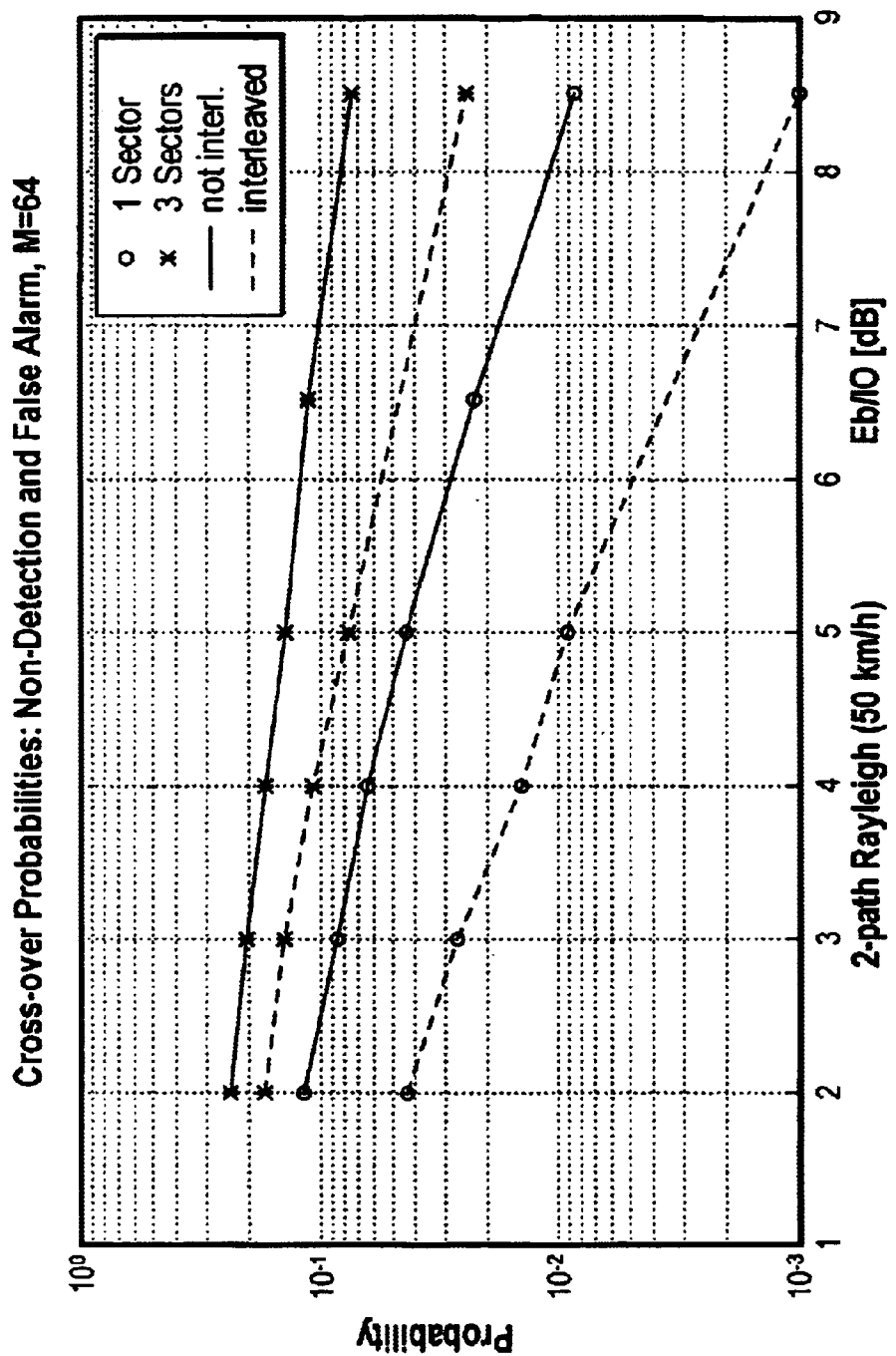
FIG. 18 shows cross-over probabilities for a 2-path Rayleigh fading.

FIG. 18 shows the performance of the algorithm over $E_b/I_0$. The probability values at the intercept points as depicted in FIG. 17 were taken. For practical purposes the threshold factor should be slightly increased to provide more security against false alarms introducing a slight performance degradation.

Figure 19:
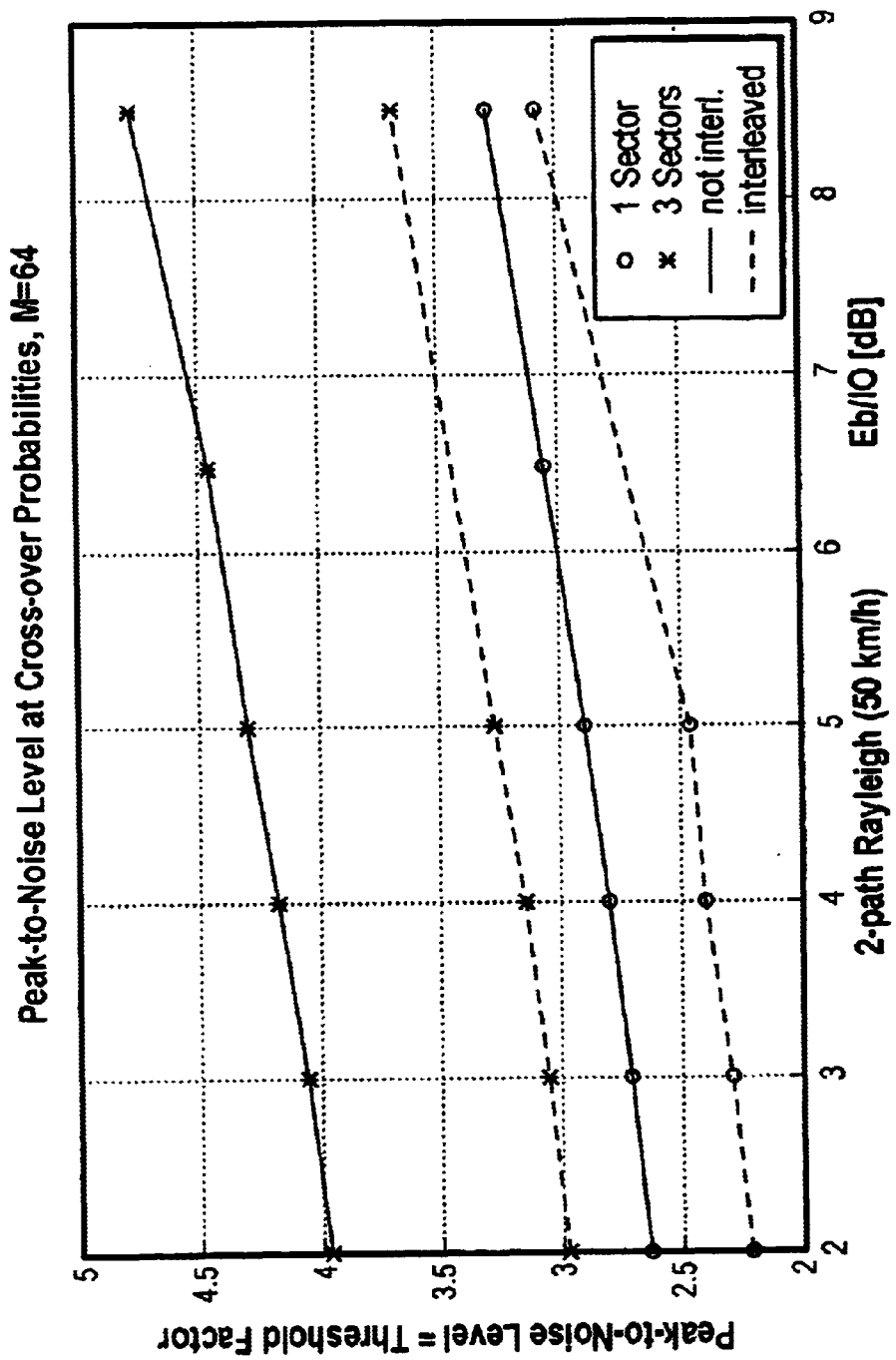
FIG. 19 shows the peak-to-noise level at cross-over probabilities for M=64 and 2-path Rayleigh fading.

FIG. 19 gives an impression how an optimal threshold factor is dependent on the signal-to-noise ratio, the number of (scanned) sectors and (inherently) the number of non-coherent accumulations.

Industrial Applicability

The proposed invention can be used in any (periodically) pilot symbol based transmission scheme for delay profile estimation and path detection. It is a very prospective candidate with respect to constraints on hardware expenditure, flexibility and accuracy of the profile and noise estimations. That is by adapting the number of searchers in combination with the proposed scheme of coherent and non-coherent accumulations (OP interleaved averaging scheme) nearly any trade-off between accuracy and hardware expenditure can be achieved. Non-coherent averaging is applied in order to reduce peak and noise variances. A wide variety of sector selection schemes (scheduling) can be applied.

This description, the preferred embodiments and examples of the invention as presently perceived as the best mode of the invention have been described. However, it is obvious that various modifications and variations of the invention are possible for a skilled person in view of the above technical teachings. Therefore, the invention should not be seen as being restricted to the above-described embodiments and examples and the scope of the invention is defined by the attached claims. In the claims, reference numerals only serve clarification purposes and do not limit the scope of these claims.

What is claimed is:

1. An apparatus for determining a power delay spectrum of a code division multiple access (CDMA) signal transmission between a CDMA base station and a CDMA mobile station on a plurality of propagation paths within a cell of a CDMA communication system, comprising:

an analog-to-digital (A/D) converter for converting an analog CDMA multipath signal received from at least one antenna within said cell into a digital CDMA multipath signal;

wherein said A/D converter is adapted for converting said analog CDMA multipath signal into a digital CDMA multipath signal having consecutive radio frames including consecutive time slots with spread complex pilot symbols and spread data symbols;

a demultiplexer for extracting spread complex pilot symbols and spread data symbols from at least two consecutive time slots of each radio frame and for storing the extracted spread complex pilot symbols consecutively in a memory thereof; and at least one search processor for determining a power delay spectrum of each of the at least one antenna on the basis of said extracted and stored spread complex pilot symbols and said spread data symbols.

2. The apparatus according to claim 1, further comprising:

a despreading sequence generator for generating a predetermined despreading sequence;

a despreader for despreading each of said complex pilot symbols with said despreading sequence to output complex despread pilot values for each time slot; and an averaging unit for averaging said despread complex pilot values, comprising:

a coherent accumulator for coherently adding the real and imaginary parts of corresponding despread complex pilot symbols of at least two consecutive time slots into one complex power delay spectrum sample value;

an absolute value determiner for outputting one real power delay spectrum sample value by determining the absolute value of said one complex power delay spectrum sample value; and a phase controller for successively shifting the phase between said despreading sequence generated by said despreading generator and said extracted and stored pilot symbols and said data symbols a predetermined number of times, wherein said absolute value determiner outputs as a real power delay spectrum a predetermined number of real power delay spectrum sample values dependent on the phase shift.

3. The apparatus of claim 1, wherein the apparatus is part of a system comprising at least one of the CDMA base station and the CDMA mobile station.

4. The apparatus according to claim 2, wherein:

said despreader, said coherent accumulator, and said absolute value determiner determine at each phase shift a plurality of real power delay spectrum sample values each value being based on the coherent addition of corresponding despread complex pilot symbols in at least two respective consecutive time slots, wherein the at least two consecutive time slots used for one value are different to those used for another value; and a non-coherent accumulator is provided for non-coherently adding the corresponding real power delay spectrum sample values to output one real power delay spectrum sample value.

5. The apparatus according to claim 1, further comprising a path selection unit for determining from said real power delay spectrum the delay times of a predetermined number of propagation paths of said multipath transmission.

6. The apparatus according to claim 3, further comprising a tracking and control unit for adapting a search window used in the at least one search processor and for updating the power delay spectrum and the delay times according to at least one of position and distance variations between said mobile station and said base station.

7. The apparatus according to claim 3, wherein:

said CDMA cell served by said CDMA base station is subdivided into a predetermined number of sectors, each comprising at least one antenna, and said A/D converter converts all of said antenna signals into a corresponding digital CDMA multipath signal; and a selector is provided for applying said digital CDMA multipath signals to said at least one search processor in response to an application control sequence output by a controller.

8. The apparatus according to claim 7, wherein each sector contains two antennas and said selector applies the converted digital CDMA multipath signals from each sector respectively to one search processor of said at least one search processor.

9. The apparatus according to claim 7, wherein the number of sectors equals the number of the at least one search processor.

10. The apparatus according to claim 7, wherein the number of sectors is not equal to the number of the at least one search processor.

11. The apparatus according to claim 1, wherein said demultiplexer comprises a switch, said memory and a sink, wherein a controller controls said switch in response to a frame clock control signal to consecutively transfer said extracted complex pilot symbols and data symbols into said memory and transfers other data symbols of said time slots into said sink.

12. The apparatus according to claim 2, wherein said despreader comprising a complex correlator having a multiplier and an integrator.

13. The apparatus according to claim 12, wherein said multiplier comprises a first, second, third and fourth multiplier and a first and second adder, wherein the first multiplier multiplies the real part of each pilot symbol with the real part of a symbol of said despreading sequence, said second multiplier multiplies the imaginary part of said pilot symbol with the real part of a symbol from said despreading sequence, said third multiplier multiplies the imaginary part of each pilot symbol with the imaginary part of said symbol of said despreading sequence, said fourth multiplier multiplies the real part of each pilot symbol with the imaginary part of said symbol of said despreading sequence, said first adder adds the outputs from the first and third multiplier and said second adder adds the outputs of said second and said fourth multipliers, wherein said integrator comprises a first and second summation unit which respectively add the values output from said first and second adder over a predetermined number of pilot chips, wherein said first and second summation unit respectively output the real and the imaginary part of said complex despread pilot values.

14. The apparatus according to claim 5, wherein said path selection unit comprises:

a peak detection/removal unit for detecting a predetermined number of peaks in said power delay spectrum and for setting zero or removing at least those samples of said real power delay spectrum corresponding to the detected peaks and a predetermined number of additional samples left and right to said maximum;

a noise estimator for averaging the real power delay spectrum having the peak samples and said additional samples set to zero or removed to determine an effective noise value; and a path estimator for selecting delay times of the determined peaks which exceed a threshold formed by multiplying the effective noise value with a threshold factor.

15. The apparatus according to claim 8, wherein said path selection unit further comprises:

an adder to sum up a first and second real power delay spectrum of the two antennas per sector, wherein the peak detection/removal unit detects and zeros peaks in said added real power delay spectrum; and first and second path verification units for comparing the multiplied threshold determined by said path estimator respectively with said first and second real power delay spectrum of each antenna at the determined delay values wherein only such peaks in the first and second power delay spectrum are detected which are equal or above the multiplied threshold.

16. The apparatus according to claim 15, further comprising a maximum detection unit for receiving the candidate peaks from the respective path verification units from a plurality of search processors of the at least one search processor, each serving one or more sectors and for ordering a predetermined number of highest peaks as well as their delay times output by the path verification units of the respective plurality of search processors in a descending order and for determining a selection information for each delay time indicating to which sector the respective delay times belong.

17. The apparatus according to claim 2, wherein said radio frames each comprise sixteen time slots, wherein a plurality of real power delay spectra are calculated non-coherently.

18. The apparatus according to claim 6, wherein said tracking and control unit receives said selection information values and said delay times and selects a predetermined number of delay times and corresponding selection information.

19. The apparatus according to claim 18, wherein said tracking and control unit uses a predetermined sector scanning rule for the currently active and non-active sectors as indicated by said selection information for instructing said selector to apply the respective antenna signals from the respective sectors to said at least one search processor according to said predetermined sector scanning rule.

20. The apparatus according to claim 19, wherein said tracking and control unit determines, on the basis of the number of time slots in each radio frame, the number of total sectors, the number of the at least one search processor, a predetermined update period for active sectors and the number of currently active and non-active sectors as indicated by said selection information, a predetermined number of coherent and non-coherent calculations of the real power delay spectrum and the update period for non-active sectors, said sector scanning rule indicating which sector is to be scanned at each respective time slot of each radio frame.

21. The apparatus according to claim 19, wherein said tracking and control unit evaluates changes in the respective real power delay spectra over time in each active and non-active sector with respect to each other in order to determine the moving direction and the sector of the cell in which said mobile station moves.

22. The apparatus according to claim 19, wherein said tracking and control unit selects a new sector scanning rule whenever a status of a scanned sector changes from active to non-active or vice versa.

23. The apparatus according to claim 3, wherein the apparatus is part of a system comprising at least one of the CDMA base station and the CDMA mobile station, and wherein the apparatus is connected to a RAKE receiver thereof.

24. A path selection apparatus for determining delay times of a code division multiple access (CDMA) signal transmission between a CDMA base station and a CDMA mobile station on a plurality of propagation paths within a CDMA cell subdivided into a predetermined number of sectors respectively with two diversity reception antennas, said delay times are delay times associated with one of said sectors, said path selection apparatus including:
    an adder to sum up a first and second real power delay spectrum of the two antennas per sector into an added power delay spectrum;
    a peak detection/removal unit for detecting a predetermined number of peaks in said added power delay spectrum and for removing or setting to zero at least those samples of said added real power delay spectrum corresponding to the detected peaks;
    a noise estimator for averaging said added real power delay spectrum having the peak samples removed or set to zero to determine an effective noise value;
    a path estimator for selecting delay times of those determined peaks which exceed a threshold formed by multiplying the effective noise value with a threshold factor;
    a first and second path verification units for comparing the multiplied threshold determined by said path estimator respectively with said first and second real power delay spectrum of each antenna at the determined delay times wherein only such delay times are detected whose peaks in the first and second power delay spectrum are equal or above the multiplied threshold.

25. The apparatus according to claim 24, wherein said path selection apparatus further comprises:
    a maximum detection unit for receiving the candidate peaks from the respective path verification units from a plurality of search processors, each serving one or more sectors and for ordering a predetermined number of highest peaks as well as their delay times output by the path verification units of the respective search processor of the at least one search processor in a descending order and for determining a selection information for each delay time indicating to which sector the respective delay times belong.

26. A searching and tracking unit for determining at least one of the location and the moving direction of a code division multiple access (CDMA) CDMA mobile station of a CDMA signal transmission between a CDMA base station and a CDMA mobile station on a plurality of propagation paths within a CDMA cell subdivided into a predetermined number of sectors respectively with two reception antennas on the basis of a determination of delay times, including:
    a plurality of search processors for determining real power delay spectra of the multipath transmission in each sector;
    a path selection unit for determining from said real power delay spectra the delay times of a predetermined number of strongest propagation paths of said multipath transmission and respective selection information indicating the active sectors to which said delay times belong;
    a tracking and control unit for determining on the basis of said delay times and said selection information of the active and non-active sectors, a sector scanning rule to instruct the selector to apply particular antenna signals to said plurality of search processors at particular timings in the respective time slots of the radio frames and for evaluating the real power delay spectra respectively obtained when applying the particular antenna signals to the plurality of search processors to determine at least one of the location and the moving direction of the mobile station within the CDMA cell.

27. The apparatus according to claim 26, wherein said tracking and control unit receives said selection information values and said delay times and selects a predetermined number of delay times and corresponding selection information.

28. The apparatus according to claim 26, wherein said tracking and control unit determines, on the basis of the number of time slots in each radio frame, the number of total sectors, the number of the plurality of search processors, a predetermined update period for active sectors, and the number of currently active and non-active sectors as indicated by said selection information, a predetermined number of coherent and non-coherent calculations of the real power delay spectrum and the update period for non-active sectors, said sector scanning rule indicating which sector is to be scanned at each respective time slot of each radio frame.

29. The apparatus according to claim 26, wherein said tracking and control unit selects a new sector scanning rule whenever a status of a scanned sector changes from active to non-active or vice versa.

30. A method of determining a power delay spectrum of a code division multiple access (CDMA) signal transmission between a CDMA base station and a CDMA mobile station on a plurality of propagation paths within a cell of a CDMA communication system, the method comprising:
    converting an analog CDMA multipath signal received from at least one antenna within said cell into a digital CDMA multipath signal, the digital CDMA multipath signal having consecutive radio frames including consecutive time slots with spread complex pilot symbols and spread data symbols;
    extracting spread complex pilot symbols and spread data symbols from at least two consecutive time slots of each radio frame;
    storing the extracted spread complex pilot symbols consecutively in a memory; and
    determining a power delay spectrum of each of the at least one antenna on the basis of said extracted and stored spread complex pilot symbols and said spread data symbols.

31. The method according to claim 30, further comprising:
generating a predetermined despreading sequence;
despreading each of said complex pilot symbols with said despreading sequence to output complex despread pilot values for each time slot; and
averaging said despread complex pilot values, the step of averaging comprising:
coherently adding the real and imaginary parts of corresponding despread complex pilot symbols of at least two consecutive time slots into one complex power delay spectrum sample value;
outputting one real power delay spectrum sample value by determining the absolute value of said one complex power delay spectrum sample value; and
successively shifting the phase between said despreading sequence and said extracted and stored pilot symbols and said data symbols a predetermined number of times; and
outputting as a real power delay spectrum a predetermined number of real power delay spectrum sample values dependent on the phase shift.

32. The method of claim 30, wherein the method is performed by at least one of the CDMA base station and the CDMA mobile station.

33. The method according to claim 31, comprising:
determining at each phase shift a plurality of real power delay spectrum sample values, each value being based on the coherent addition of corresponding despread complex pilot symbols in at least two respective consecutive time slots, wherein the at least two consecutive time slots used for one value are different to those used for another value; and
non-coherently adding the corresponding real power delay spectrum sample values to output one real power delay spectrum sample value.

34. The method according to claim 30, further comprising determining from said real power delay spectrum the delay times of a predetermined number of propagation paths of said multipath transmission.

35. The method according to claim 32, further comprising adapting a search window and updating the power delay spectrum and the delay times according to at least one of position and distance variations between said mobile station and said base station.

36. A path selection method for determining delay times of a code division multiple access (CDMA) signal transmission between a CDMA base station and a CDMA mobile station on a plurality of propagation paths within a CDMA cell subdivided into a predetermined number of sectors respectively with two diversity reception antennas, said delay times are delay times associated with one of said sectors, said path selection method including:
summing up a first and second real power delay spectrum of the two antennas per sector into an added power delay spectrum;
detecting a predetermined number of peaks in said added power delay spectrum and removing or setting to zero at least those samples of said added real power delay spectrum corresponding to the detected peaks;
averaging said added real power delay spectrum having the peak samples removed or set to zero to determine an effective noise value;
selecting delay times of those determined peaks which exceed a threshold formed by multiplying the effective noise value with a threshold factor;
comparing the multiplied threshold with said first and second real power delay spectrum of each antenna at the determined delay times; and
wherein only delay times having peaks in the first and second power delay spectrum that are equal or above the multiplied threshold are detected.

37. The method according to claim 36, wherein said path selection method further comprises receiving the candidate peaks, ordering a predetermined number of highest peaks as well as their delay times output in a descending order, and determining a selection information for each delay time indicating to which sector the respective delay times belong.

38. A method of determining at least one of the location and the moving direction of a code division multiple access (CDMA) mobile station of a CDMA signal transmission between a CDMA base station and a CDMA mobile station on a plurality of propagation paths within a CDMA cell subdivided into a predetermined number of sectors respectively with two reception antennas on the basis of a determination of delay times, the method including:
determining real power delay spectra of the multipath transmission in each sector;
determining from said real power delay spectra the delay times of a predetermined number of strongest propagation paths of said multipath transmission and respective selection information indicating the active sectors to which said delay times belong; and
determining, on the basis of said delay times and said selection information of the active and non-active sectors, a sector scanning rule used in connection with application of particular antenna signals at particular timings in the respective time slots of the radio frames and evaluating the real power delay spectra respectively obtained when applying the particular antenna signals to determine at least one of the location and the moving direction of the mobile station within the CDMA cell.

39. The method according to claim 38, wherein said step of determining a sector scanning rule comprises receiving said selection information and said delay times and selecting a predetermined number of delay times and corresponding selection information.

40. The method according to claim 38, wherein said step of determining a sector scanning rule comprises determining, on the basis of the number of time slots in each radio frame, the number of total sectors, a predetermined update period for active sectors, and the number of currently active and non-active sectors as indicated by said selection information, a predetermined number of coherent and non-coherent calculations of the real power delay spectrum and the update period for non-active sectors, said sector scanning rule indicating which sector is to be scanned at each respective time slot of each radio frame.

41. The method according to claim 38, wherein said step of determining a sector scanning rule comprises selecting a new sector scanning rule whenever a status of a scanned sector changes from active to non-active or vice versa.

* * * * *